US012664804B2

(12) United States Patent
Moustafa et al.

(10) Patent No.: US 12,664,804 B2
(45) Date of Patent: Jun. 23, 2026

(54) PREDICTIVE MACHINE LEARNING FEATURE SELECTION

(71) Applicant: Optum Services (Ireland) Limited, Dublin (IE)

(72) Inventors: Karim M Mahmoud Mohamed Moustafa, Dublin (IE); Eugene Edward Farrell, Galway (IE); Lisa E. Walsh, Dublin (IE); Harutyun Shahumyan, Dublin (IE); Smitashree Choudhury, Dublin (IE); Arjit Agrawal, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 362 days.

(21) Appl. No.: 18/351,792

(22) Filed: Jul. 13, 2023

(65) Prior Publication Data

US 2025/0022299 A1    Jan. 16, 2025

(51) Int. Cl.
*G06V 30/19* (2022.01)

(52) U.S. Cl.
CPC .. *G06V 30/19013* (2022.01); *G06V 30/19167* (2022.01)

(58) Field of Classification Search
CPC .................. G06V 30/19013; G06V 30/19167
See application file for complete search history.

(56) References Cited

U.S. PATENT DOCUMENTS

| | | | |
|---|---|---|---|
| 11,250,951 B2 | 2/2022 | Takata et al. | |
| 11,361,243 B2 | 6/2022 | Misra et al. | |
| 11,475,239 B2 | 10/2022 | Xie et al. | |

(Continued)

FOREIGN PATENT DOCUMENTS

| | | | | | |
|---|---|---|---|---|---|
| CN | 110968725 A | * | 4/2020 | ........... | G06F 18/214 |
| CN | 110121180 B | * | 12/2020 | ......... | H04L 41/0889 |

(Continued)

OTHER PUBLICATIONS

Brownlee, Jason, "How to Calculate Feature Importance With Python", Machine Learning Mastery, Mar. 30, 2020, (81 pages).

(Continued)

*Primary Examiner* — Huo Long Chen
(74) *Attorney, Agent, or Firm* — Alston & Bird LLP

(57) ABSTRACT

Various embodiments of the present disclosure provide feature engineering techniques for improving machine learning model development, performance, and maintenance. The feature engineering techniques include generating a model description vector from a textual model description for a target machine learning model and using the model description vector to generate one or more description-based similarity vectors that each include one or more of a plurality of similarity scores for a plurality of machine learning features. The feature engineering techniques include generating a label-based similarity vector based on a comparison between training data for the target machine learning model and a plurality of feature values of the plurality of machine learning features. The feature engineering techniques include providing a predictive feature set for the target machine learning model based on the one or more similarity vectors and the one or more label-based similarity vectors.

20 Claims, 10 Drawing Sheets

(56)           References Cited

U.S. PATENT DOCUMENTS

| 11,556,837 | B2 | 1/2023 | Wu et al. |
| 2021/0406779 | A1 | 12/2021 | Hu et al. |
| 2022/0019936 | A1 | 1/2022 | Sarda et al. |
| 2022/0327401 | A1 | 10/2022 | Whitney et al. |

FOREIGN PATENT DOCUMENTS

| CN | 112836520 | A | * | 5/2021 | ......... G06F 18/2415 |
| CN | 115809341 | A | * | 3/2023 | |
| EP | 3825926 | A1 | | 5/2021 | |
| KR | 101665861 | B1 | * | 10/2016 | ....... G06F 17/30997 |

OTHER PUBLICATIONS

Datta, et al., "Unsupervised Feature Recommendation using Representation Learning", Retrieved from https://eurasip.org/Proceedings/Eusipco/Eusipco2022/pdfs/0001591.pdf, (2022), 5 pages.
Parmezan, et al., "Automatic Recommendation of Feature Selection Algorithms Based on Dataset Characteristics", Expert Systems with Applications, vol. 185, Dec. 15, 2021, https://doi.org/10.1016/j.eswa.2021.115589.

* cited by examiner

500

324

| Feature Name | Relevance Value |
| --- | --- |
| Provider Panel Size | 2.43 |
| Distance to Member | 0.9 |
| Provider Degree | 0.8 |
| X-Ray Availability | 0.8 |
| Provider Grad School | 0.75 |
| Chronic Cond Patients | 0.75 |
| Provider Tenure | 0.7 |
| Provider First Language | 0.63 |
| Prov Contract Type | 0.63 |
| Provider Age | 0.45 |

502

504

600

RECEIVE MODEL DATA 602

GENERATE QUALITY METRICS 604

GENERATE DESCRIPTION-BASED SIMILARITY VECTORS 606

GENERATE LABEL-BASED SIMILARITY VECTOR 608

GENERATE SCALED FEATURE RELEVANCE SCORES 610

GENERATE PREDICTIVE FEATURE SET 612

700

606

GENERATE DOCUMENT VECTORS 702

GENERATE MODEL DESCRIPTION VECTOR 704

IDENTIFY RELEVANT DOCUMENTS 706

GENERATE FEATURE DESCRIPTION VECTORS 708

GENERATE DOMAIN-BASED SIMILARITY SCORES BASED ON RELEVANT DOCUMENT VECTORS AND FEATURE DESCRIPTION VECTORS 710

GENERATE DOMAIN-BASED SIMILARITY VECTOR 712

800

606

GENERATE MODEL DESCRIPTION VECTOR
802

GENERATE FEATURE DESCRIPTION VECTORS
804

GENERATE PROBLEM-BASED SIMILARITY
SCORES BASED ON MODEL DESCRIPTION
VECTOR AND FEATURE DESCRIPTION
VECTORS 806

GENERATE PROBLEM-BASED SIMILARITY
VECTOR 808

900

606

GENERATE MODEL VECTORS 902

GENERATE MODEL DESCRIPTION VECTOR 904

GENERATE HISTORICAL MODEL-BASED SIMILARITY SCORE 906

IDENTIFY RELEVANT MODELS 908

IDENTIFY RELEVANT FEATURES BASED ON THE RELEVANT MODELS 910

GENERATE HISTORICAL MODEL-BASED SIMILARITY VECTOR BASED ON THE RELEVANT FEATURES AND HISTORICAL MODEL-BASED SIMILARITY SCORE 912

PREDICTIVE MACHINE LEARNING FEATURE SELECTION

BACKGROUND

Various embodiments of the present disclosure address technical challenges related to feature engineering techniques for machine learning models given limitations of existing feature engineering techniques. Existing feature engineering techniques may require the combination of technical and domain knowledge from various disparate entities as well as numerous testing and validation processes to determine and verify relevant features for developing a machine learning model. Such techniques are time consuming, resource intensive, and fail to account for large feature datasets. Moreover, traditional feature engineering techniques search for features from within to a single feature domain. By doing so, such feature engineering techniques fail to account for similarities between problems in different feature domains that share machine learning features. These limitations prevent traditional feature engineering techniques from generating holistic feature recommendations for machine learning models, which ultimately degrades of the performance of machine learning models and limits the efficacy of large feature datastores with diverse feature sets. Some existing solutions for navigating large feature datastores rely on targeted search queries for specific features. However, these solutions rely on in depth knowledge of the large feature store to generate a targeted query and do not surface unknown or unconventional machine learning features that may be relevant for a target machine learning model. Various embodiments of the present disclosure make important contributions to various existing feature engineering approaches by addressing these technical challenges.

BRIEF SUMMARY

Various embodiments of the present disclosure disclose feature engineering techniques for improved machine learning model development, tracking, and execution using large, diverse feature datastores. Traditional feature engineering techniques rely on domain knowledge and technical expertise from a variety of disparate sources. Such information requires prior experience and lacks the adaptability to accommodate for dynamically changing feature datastores. Some of the feature engineering techniques of the present disclosure address these deficiencies by leveraging natural language processing and machine learning techniques to generate a plurality of similarity vectors that correlate different machine learning features to different aspects of a machine learning model. For instance, some of the feature engineering techniques of the present disclosure may generate a predictive feature set for a machine learning model by identifying relevant quality features based on a textual description, past usage history, feature popularity, and/or domain knowledge associated with the machine learning model. By doing so, some of the feature engineering techniques of the present disclosure may automate and improve the comprehensiveness of data preparation for developing a machine learning model, while enabling the generation and maintenance of more reusable and interoperable models that are capable of sharing features across feature domains.

In some embodiments, a computer-implemented method includes generating, by one or more processors, a model description vector from a textual model description for a target machine learning model; generating, by the one or more processors, one or more description-based similarity vectors based on the model description vector, wherein (i) a description-based similarity vector of the one or more description-based similarity vectors include one or more of a plurality of similarity scores for a plurality of machine learning features, and (ii) the plurality of similarity scores is based on the model description vector; generating, by the one or more processors, a label-based similarity vector based on a comparison between training data for the target machine learning model and a plurality of feature values of the plurality of machine learning features; and providing, by the one or more processors, a predictive feature set for the target machine learning model based on the one or more description-based similarity vectors and the label-based similarity vector.

In some embodiments, a computing system includes a memory and one or more processors communicatively coupled to the memory, the one or more processors are configured to generate a model description vector from a textual model description for a target machine learning model; generate one or more description-based similarity vectors based on the model description vector, wherein (i) a description-based similarity vector of the one or more description-based similarity vectors include one or more of a plurality of similarity scores for a plurality of machine learning features, and (ii) the plurality of similarity scores is based on the model description vector; generate a label-based similarity vector based on a comparison between training data for the target machine learning model and a plurality of feature values of the plurality of machine learning features; and provide a predictive feature set for the target machine learning model based on the one or more description-based similarity vectors and the label-based similarity vector.

In some embodiments, one or more non-transitory computer-readable storage media include instructions that, when executed by one or more processors, cause the one or more processors to generate a model description vector from a textual model description for a target machine learning model; generate one or more description-based similarity vectors based on the model description vector, wherein (i) a description-based similarity vector of the one or more description-based similarity vectors include one or more of a plurality of similarity scores for a plurality of machine learning features, and (ii) the plurality of similarity scores is based on the model description vector; generate a label-based similarity vector based on a comparison between training data for the target machine learning model and a plurality of feature values of the plurality of machine learning features; and provide a predictive feature set for the target machine learning model based on the one or more description-based similarity vectors and the label-based similarity vector.

DETAILED DESCRIPTION

Figure 1:
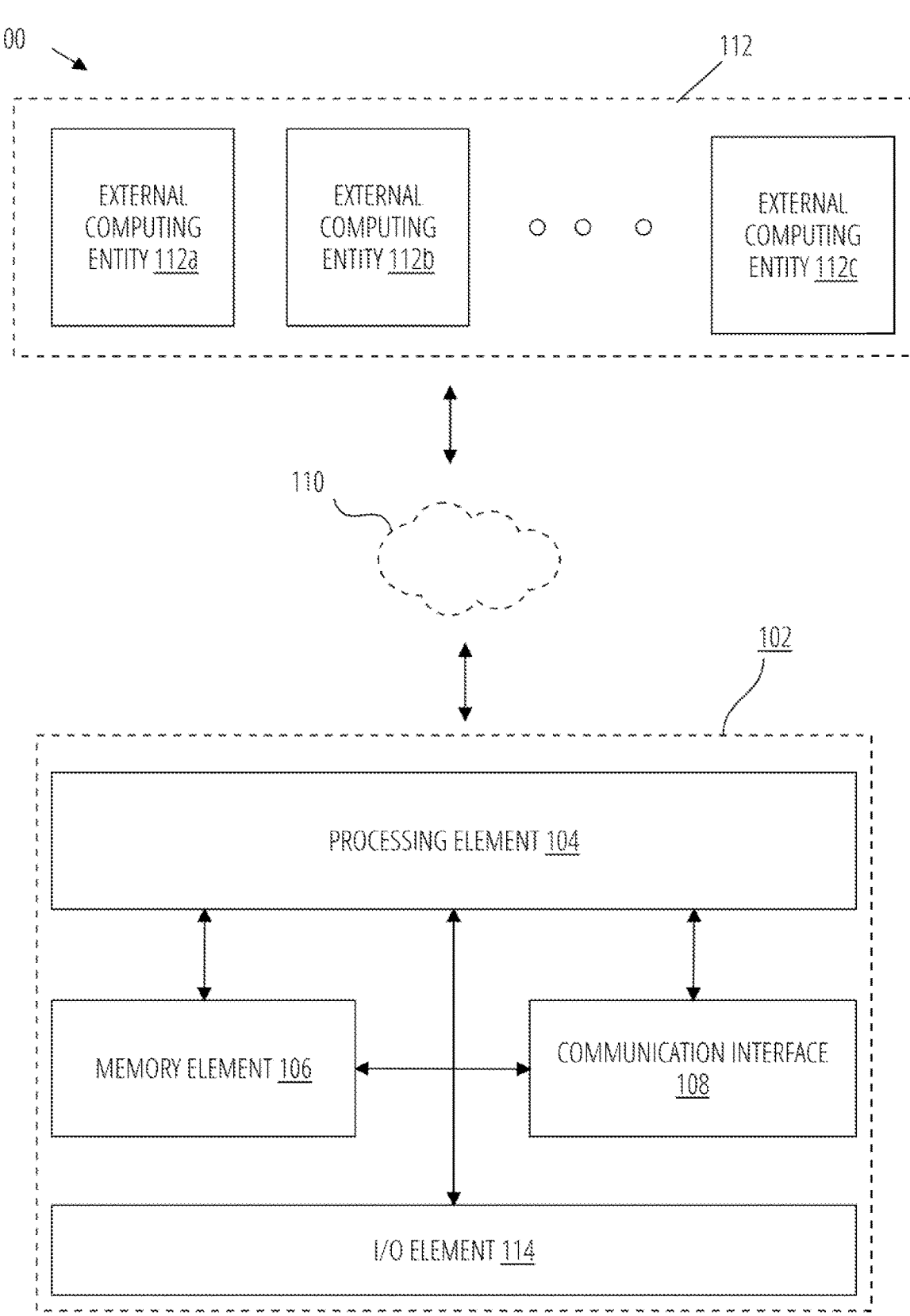
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., feature engineering techniques, feature discovery techniques, and/or the like) described herein.

The external computing entities 112a-c, for example, may include and/or be associated with one or more feature data sources of a feature datastore that may be configured to receive, store, manage, and/or facilitate datasets that include one or more entities and/or entity features. The external computing entities 112a-c, for example, may provide the access to the data to the predictive computing entity 102 through a robust, comprehensive, feature datastore. By way of example, the predictive computing entity 102 may include a machine learning platform that is configured to leverage data from the external computing entities 112a-c and/or one or more other data sources to develop, maintain, and/or execute a target machine learning model. In some examples, the operations of the predictive computing entity 102 may leverage the aggregation of data from across the external computing entities 112a-c through a feature datastore. The external computing entities 112a-c, for example, may be associated with one or more data repositories, cloud platforms, compute nodes, organizations, and/or the like, that may be individually and/or collectively leveraged by the predictive computing entity 102 to obtain and aggregate machine learning features regarding various entities. As one example, in a clinical prediction domain, the external computing entities 112a-c may include clinical healthcare providers that maintain electronic health records for one or more patients.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
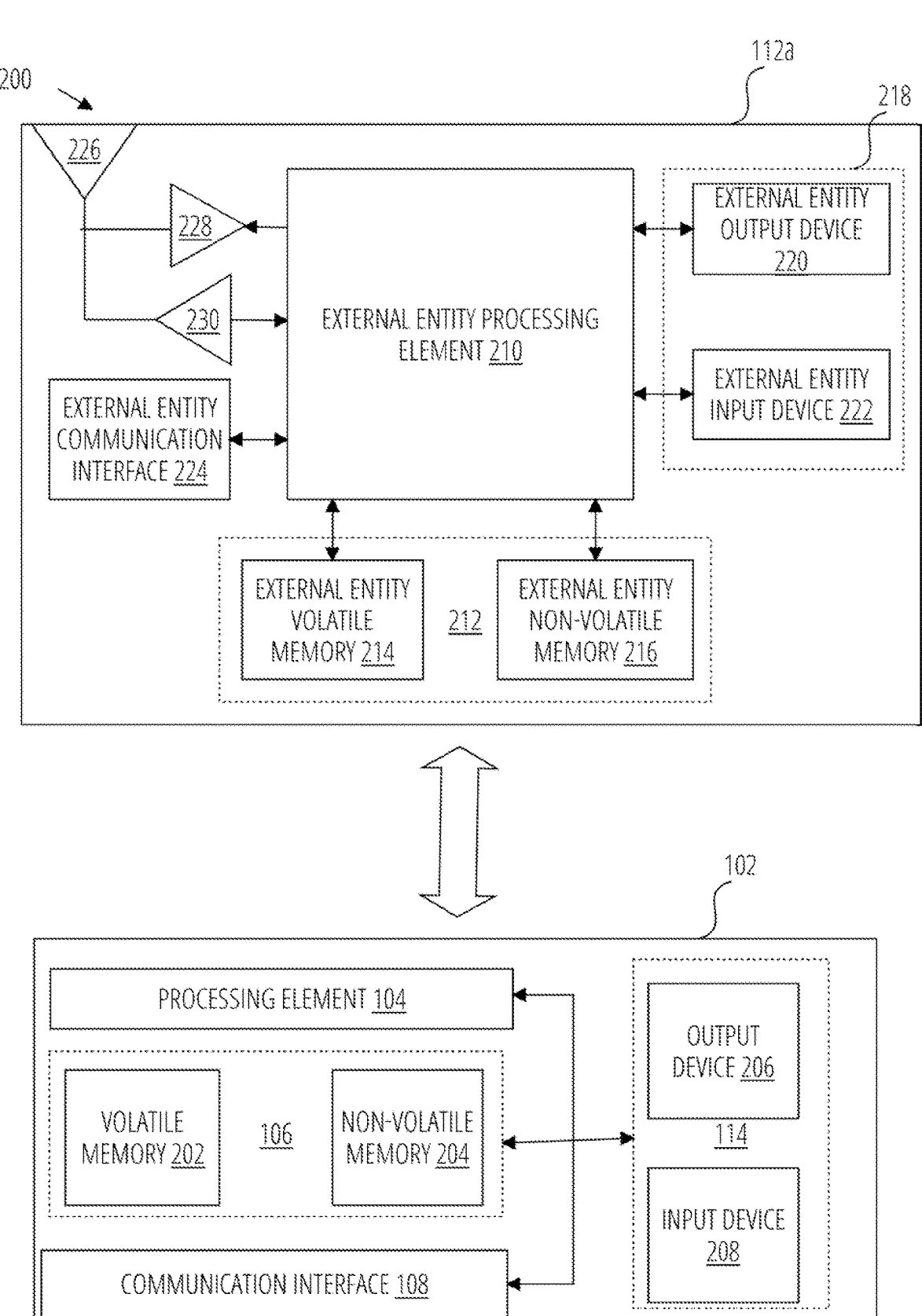
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include one or more external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/ data. Some of the indoor systems may use various position or location technologies including RFID tags, indoor beacons or transmitters, Wi-Fi access points, cellular towers, nearby computing devices (e.g., smartphones, laptops), and/ or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "target machine learning model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A target machine learning model may include any type of model configured, trained, and/or the like to generate an output for a predictive and/or classification task in any predictive domain. A target machine learning model may include one or more of any type of machine learning model including one or more supervised, unsupervised, semi-supervised, reinforcement learning models, and/or the like. For instance, a target machine learning model may include a supervised model that may be trained using training data configured by a user. In some examples, a target machine learning model may include multiple models configured to perform one or more different stages of a classification and/or prediction process.

In some embodiments, a target machine learning model is designed and/or trained for any purpose depending on the prediction domain. In some examples, a target machine learning model may be trained to generate a classification and/or prediction for an input data object based one or more features of the input data object. For instance, the target machine learning model may include a plurality of weighted features that are leveraged to generate a classification, prediction, and/or the like for an input data object. In some examples, the features considered by a target machine learning model may be selected during a design phase of the model through a features discovery process. Discovering features may be time consuming, resource intensive, and subject to inaccuracies, inefficiencies, and the like. For example, due to a large number of available features in a domain and frequent updates to the large number of features, an optimal feature set for a target machine learning model may include features that are hidden, unknown, and/or lack an existing correlation with a particular task. Some techniques of the present disclosure enable the efficient design of a target machine learning model by leveraging a target model profile to generate a predictive feature set for the target machine learning model. The predictive feature set may be generated to improve model performance based on the goals of the model and other aspects of the target model profile.

In some embodiments, the term "target model profile" refers to a data entity that describes one or more targeted aspects for a target machine learning model. A target model profile may include one or more model attributes. Each model attribute may be indicative of a targeted aspect of the target machine learning model. For instance, the target model profile may include a textual model description that records a purpose for the target machine learning model. In addition, or alternatively, the target model profile may include a model domain that is indicative of prediction and/or classification category for the target machine learning model. A prediction and/or classification category, for example, may be indicative of a technical and/or knowledge domain associated with the target machine learning model and/or an output thereof. By way of example, a model domain may be indicative of a healthcare provider recommendation domain that leverage a corpus of knowledge considered by health care professionals to provide a healthcare provider recommendation. In addition, or alternatively, the model domain may be indicative of a financial services prediction domain, a media recommendation domain, a real estate prediction domain, an image classification domain, and/or the like.

In some embodiments, the one or more model attributes include structural attributes, such as a model type, model objective, and/or user preferences. The model type may include an output type for a target machine learning model, such as a classification type (e.g., configured to output a predictive classification for an input data object, etc.), a prediction type (e.g., configured to output a probability indicative of a likelihood of an event, etc.), a recommendation type (e.g., configured to provide a list of outputs that satisfy criteria, etc.), a regression type, and/or the like. The model objective may be indicative of an output class for a target machine learning model, such as a binary class, a probability class, a segmentation class, and/or the like. The user preferences may be indicative of one or more feature preferences for a target machine learning model. The user preferences, for example, may be indicative of one or more feature data source requirements, such as a source refresh frequency (e.g., weekly, monthly, etc.), a dataset type (e.g., tabular, image, natural language text, etc.), one or more specified data sources (e.g., one or more of member claims, member engagements, member utilization, member provider, member medical profile, member socio-eco, member contract, and/or member time series events, etc. for a clinical domain), and/or the like. In some examples, the user preferences may be indicative of one or more feature preferences, such as a feature coverage (e.g., percentage of data objects within a dataset that include a feature value for a particular feature, etc.), and/or the like.

In some embodiments, a target model profile is provided by a user. For instance, the one or more model attributes may be provided through a user interface. The user interface, for instance, may include model development user interface that is configured to interact with a user to generate a target machine learning model and/or one or more aspects thereof. Using the development user interface, a user may specify one or more of the model attributes. In some examples, the user interface (and/or one or more hosting servers) may generate the target model profile based on user input to the user interface. Using some of the techniques of the present disclosure, the target model profile may be leveraged to generate a predictive feature set. The user interface may respond to the user input with a rendering of the predictive feature set and/or an indication of the relevance of each relevant feature in the predictive feature set.

In some embodiments, the term "textual model description" refers to an aspect of the target model profile. The textual model description may include natural language and/or structured language text that describes, in plain text, one or more aspects of the target machine learning model. The textual model description may be provided by a user to describe one or more model objectives, inputs, outputs, domain, and/or the like in plain text. For instance, the textual model description may include natural language text. By way of example, in a clinical prediction domain, a textual model description may be "This model aims to find the most relevant provider based on the historical provider performance training data."

In some embodiments, the term "training data" refers to a data entity that describes training data for a target machine learning model. Training data may include a supervised training dataset that includes labeled training entities. For instance, the training data may include a plurality of training input-output pairs. Each training input-output pair may include a training input and a corresponding training output. A training input, for example, may include a data entity that may be processed by a machine learning model to generate an output, such as a classification and/or prediction for the training input. The training output may include a ground truth for the training input.

In some embodiments, training data includes a portion of the target model profile. For instance, training data may be selected by a user through a development user interface. By way of example, in the event that a user is developing a model for a healthcare provider recommendation, the user may select training data which includes historical data and/or an identification (e.g., a member identifier, etc.) of one or more members associated with a healthcare provider. In addition, the user may select one or more target labels that may be used for training a target machine learning model based on the historical and/or member data. The target labels may include binary labels (1/0) that indicate whether the performance of a previously recommended provider was high (1) or low (0).

In some embodiments, the term "training input" refers to a data entity that describes an input for a target machine learning model. A training input may include any type of input based on the target machine learning model. In some examples, the training input may include an identifier (e.g., a member identifier, an employee number, etc) that corresponds to a data object that includes a plurality of object feature values for a data entity (e.g., member, employee, etc.). The plurality of object feature values, for example, may include respective values corresponding to a machine learning feature for a data entity. By way of example, a feature value may be indicative of a presence of a machine learning feature (e.g., a binary value), a degree of the machine learning feature (e.g., a likelihood, probability, etc.), and/or the count (e.g., number of occurrences, etc.) for a machine learning feature. In some examples, the training input may include a corresponding training output that may be used to correlate the plurality of object feature values to an output for a machine learning model through one or more supervised training techniques.

In some embodiments, the term "training output" refers to a data entity that describes an output for a target machine learning model. The training output may include a ground truth label for a training input. The training output, for example, may include a binary label, a degree, and/or any other data entity that is configured to represent a desired output of a target machine learning model.

In some embodiments, the term "machine learning feature" refers to a data entity that describes a feature that may be considered by a machine learning model to generate an output. In some examples, a machine learning feature may include a recorded feature that is stored, maintained, and/or otherwise accessible through a feature datastore. For example, a feature datastore may include hundreds, thousands, and/or more features, a subset of which may be predictive of a desired output for a target machine learning model. During model development, a user may face challenges on selecting features to be considered by a target machine learning model. In some examples, using some of the techniques of the present disclosure, a predictive feature set may be generated from the feature datastore for use in developing a target machine learning model based on feature metadata corresponding to a plurality of machine learning features of the feature datastore.

In some embodiments, the feature metadata is indicative of one or more attributes for a machine learning feature, such as a textual feature description, a number of machine learning models, a feature domain, feature datatype, a feature coverage, and/or any other data that may be recorded for a machine learning feature and/or indicative of a characteristic of the machine learning feature, In some embodiments, the term "textual feature description" refers a data entity that represents an aspect of the feature metadata for a particular machine learning feature. The textual feature description may include natural language and/or structured language text that describes, in plain text, one or more aspects of the machine learning feature.

In some embodiments, the term "feature value" refers to a data entity that represents a particular feature value corresponding a machine learning feature for an input data object. For example, a feature value may be indicative of a presence of a machine learning feature (e.g., a binary value), a degree of the machine learning feature (e.g., a likelihood, probability, etc.), a count (e.g., number of occurrence, etc.), and/or any other data type that is indicative of a particular value for a machine learning feature.

In some embodiments, the term "model description vector" refers to a data entity that represents a vectorized representation of a textual model description. A model description vector may be generated from a textual model description by applying a language processing model to the textual model description.

In some embodiments, the term "language processing model" refers to a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, the language processing model may include a vectorization model configured to generate a vectorized representation from textual data. In some examples, the language processing model may include a natural language statistical model, such as a term frequency-inverse document frequency (TF-IDF) algorithm, word2vec, CountVectorizer, bag-of-words, and/or the like. In some examples, the language processing model may include a machine learning natural language model, such as a bidirectional encoder configured to generate a bidirectional encoder representation from transformer (BERT) representation of the textual data. As will be understood by one of ordinary skill in the art, a language processing model may include any type of vectorization and/or encoding model configured to generate a vectorized and/or encoded representation from textual data.

In some embodiments, the term "feature description vector" refers to a data entity that represents a vectorized representation of a textual feature description. A feature description vector may be generated from feature metadata, such as the textual feature description, by applying a language processing model to the feature metadata (e.g., textual feature description). In some examples, the same language processing model is leveraged to generate a model description vector and a feature description vector.

In some embodiments, the term "similarity vector" refers to a data entity that describes one or more relevant features for a target machine learning model. A similarity vector may include a plurality of relevant features and a similarity score corresponding to each of the plurality of relevant features. Using some of the techniques of the present disclosure, a plurality of similarity vectors may be generated for a target machine learning model based on one or more different criteria. Each similarity vector may include one or more different relevant features and/or similarity scores.

In some embodiments, the term "similarity score" refers to a data entity that describes a similarity between a machine learning feature and an aspect of a target machine learning model. A similarity score may include any type of value representative of a relative similarity between a machine learning feature and an aspect of a target machine learning model. For instance, the similarity score may include a real number, a degree (e.g., a number between 0 and 1, etc.), and binary value, and/or the like. In some examples, a similarity score may be based on a type of similarity vector. For example, as described herein, a label-based similarity vector may include a plurality of similarity scores that are indicative of a magnitude of a correlation and/or odds ratio analysis for a plurality of machine learning features. In addition, or alternatively, a description-based similarity vector may include a plurality of similarity scores that are indicative of a vector similarity between two vectors associated with a target machine learning model and a machine learning feature. In some examples, a similarity score may be generated using a vector similarity model.

In some embodiments, the term "vector similarity model" refers to a data entity that describes parameters, hyperparameters, and/or defined operations of a rules-based, statistical, and/or machine learning model (e.g., model including at least one of one or more rule-based layers, one or more layers that depend on trained parameters, coefficients, and/or the like). A vector similarity model may be configured to generate a similarity score between two vectors. By way of example, a vector similarity model may include a cosine similarity model configured to generate a cosine similarity between two vectors. In addition, or alternatively, a vector similarity model may include a Jaccard similarity algorithm, a BERT embedding similarity algorithm, a k-means and/or Siamese Manhattan LSTM, and/or any other similarity algorithm. As will be understood by one of ordinary skill in the art, a vector similarity model may include any type of similarity algorithm and/or encoding model configured to generate a vectorized representation from a textual data.

In some embodiments, the term "relevant feature" refers to a data entity that describes a machine learning feature of a similarity vector. A relevant feature may include a machine learning feature that is associated with a similarity score that satisfies a relative similarity threshold.

In some embodiments, the term "relative similarity threshold" refers to a data entity that describes a constraint for determining relevant features of a similarity vector. A relative similarity threshold may include a count threshold and/or a score threshold. For example, a count threshold may be indicative of a limitation on the number of relevant features (e.g., a maximum number, a minimum number, etc.) for a similarity vector. The count threshold, for example, may be set by a user and/or include a static number, such as 3, 5, 10, and/or the like for constraining a size of a similarity vector for a target machine learning model. In addition, or alternatively, a score threshold may be indicative of a limitation on a similarity score (e.g., a maximum score, a minimum score, etc.) for a relevant feature to be included in a similarity vector. The score threshold, for example, may be set by a user and/or include a static score, such as 0.1, 0.5, 0.8, and/or the like for constraining a relevance of relevant features in a similarity vector for a target machine learning model.

In some embodiments, the term "description-based similarity vector" refers to a data entity that describes a similarity vector that is based on a textual model description for the target machine learning model. A description-based similarity vector may include a plurality of relevant features with a plurality of corresponding similarity scores. Each similarity score may be based on a comparison between a model description vector and another vector that may be correlated to a machine learning feature. By way of example, a description-based similarity vector may include (i) a domain-based similarity vector that includes a plurality of similarity scores each based on a comparison between a model description vector and one or more documents associated with a model domain, (ii) a problem-based similarity vector that includes a plurality of similarity scores each based on a comparison between a model description vector and one or more feature description vectors, and/or (iii) a historical model-based similarity vector that includes a plurality of similarity scores each based on a comparison between a model description vector and one or more historical machine learning model description vectors.

In some embodiments, the term "domain-based similarity vector" refers to a data entity that describes a type of description-based similarity vector. A domain-based similarity vector may include a plurality of relevant features with a plurality of corresponding similarity scores. The corresponding similarity scores may include domain-based similarity scores that are indicative of a similarity between one or more relevant documents from a model domain and feature metadata corresponding to the plurality of relevant features.

In some embodiments, the plurality of domain-based similarity scores is each based on a comparison between a model description vector and one or more domain documents associated with the model domain. The one or more domain documents, for example, may include one or more natural language domain documents that are associated with model domain. In some examples, the one or more domain documents may include one or more relevant natural language documents that are identified from a plurality of natural language documents for the model domain.

In some embodiments, one or more relevant natural language documents are identified from a plurality of natural language documents for the model domain based on a similarity score between each document and a model description vector. For example, a plurality of document similarity scores may be generated based on a comparison between a plurality of document vectors (e.g., a vectorized representation of a natural language document, etc.) that correspond to the natural language documents and the model description vector. By way of example, a vectorization transformation may be executed, using a language processing model, such as TF-IDF, and/or the like, for both the textual model description and a plurality of documents in a domain knowledge corpus of documents. A document similarity score may be generated, using a vector similarity model, such as a cosine similarity function, and/or the like, between each document vector and the model description vector to generate a plurality document similarity scores. The plurality of document similarity scores may be leveraged to identify the one or more relevant natural language documents. For example, the one or more relevant natural language documents may include a subset (e.g., top 5, 10, etc.) of the documents that is associated with the highest, lowest, and/or the like document similarity scores.

In some embodiments, the plurality of domain-based similarity scores is generated based on a comparison between one or more document vectors that correspond to the one or more relevant natural language documents and a plurality of feature description vectors that correspond to a plurality of textual feature descriptions for the plurality of machine learning features. For instance, a textual feature description from feature metadata may be vectorized, using the language processing model, to generate a plurality of feature description vectors. A domain-based similarity score may be generated, using the vector similarity model, between the one or more document vectors and each feature description vector to generate the plurality of domain-based similarity scores. The plurality of domain-based similarity scores may be leveraged to identify the one or more relevant features of the domain-based similarity vector. For example, the one or more relevant features may include a subset (e.g., top 5, 10, etc.) of the machine learning features that is associated with the highest, lowest, and/or the like domain-based similarity scores. In some examples, the domain-based similarity vector may include one or more domain-based similarity scores of the plurality of domain-based similarity scores that satisfy a relative similarity threshold.

In some embodiments, the term "problem-based similarity vector" refers to data entity that describes a type of description-based similarity vector. A problem-based similarity vector may include a plurality of relevant features with a plurality of corresponding similarity scores. The corresponding similarity scores may include problem-based similarity scores that are indicative of a similarity between a model description vector and a plurality of feature description vectors that correspond to a plurality of textual feature descriptions for the plurality of machine learning features. For instance, a textual feature description from feature metadata may be vectorized, using the language processing model, to generate a plurality of feature description vectors. A problem-based similarity score may be generated, using the vector similarity model, between the model description vector and each feature description vector to generate the plurality of problem-based similarity scores. The plurality of problem-based similarity scores may be leveraged to identify the one or more relevant features of the problem-based similarity vector. For example, the one or more relevant features may include a subset (e.g., top 5, 10, etc.) of the machine learning features that is associated with the highest, lowest, and/or the like problem-based similarity scores. In some examples, the problem-based similarity vector may include one or more problem-based similarity scores of the plurality of problem-based similarity scores that satisfy a relative similarity threshold.

In some embodiments, the term "historical model-based similarity vector" refers to a data entity that describes a type of description-based similarity vector. A historical model-based similarity vector may include a plurality of relevant features with a plurality of corresponding similarity scores. The corresponding similarity scores may include historical model-based similarity scores that are indicative of a similarity between one or more relevant models from a plurality of historical machine learning models and the textual model description.

In some embodiments, the plurality of historical model-based similarity scores is each based on a comparison between a model description vector and the one or more relevant models. The one or more relevant models, for example, may include one or more historical machine learning models that are associated with one or more of the plurality of machine learning features. In some examples, each historical machine learning model may be associated with model metadata, such as a textual model description, a model type, a model domain, and/or any other model attribute described herein.

In some embodiments, one or more relevant models are identified from a plurality of historical machine learning models based on a similarity score between each model and a model description vector. For example, a plurality of model similarity scores may be generated based on a comparison between a plurality of model vectors (e.g., a vectorized representation of the model metadata, etc.) that correspond to the historical machine learning models and the model description vector. By way of example, a vectorization transformation may be executed, using the language processing model, for both the textual model description and the model metadata for each of the plurality of historical machine learning models. A model similarity score may be generated, using the vector similarity model, between each model vector and the model description vector to generate a plurality of model similarity scores. The plurality of model similarity scores may be leveraged to identify the one or more relevant models. For example, the one or more relevant models may include a subset (e.g., top 5, 10, etc.) of the historical machine learning models that is associated with the highest, lowest, and/or the like model similarity scores.

In some embodiments, the one or more relevant features of the historical model-based similarity vector include one or more machine learning features associated with (e.g., used in, etc.) the one or more relevant models. In some examples, the historical model-based similarity score for each relevant feature may include the model similarity score corresponding to the relevant model associated with the relevant feature.

In some embodiments, the term "label-based similarity vector" refers to a data entity that describes a similarity vector that is based on training data for a target machine learning model. A label-based similarity vector may include a plurality of relevant features with a plurality of corresponding similarity scores. The corresponding similarity scores may include feature association metric scores that are indicative of an association between the training data and/or one or more machine learning features.

In some embodiments, the label-based similarity vector is based on a comparison between the training data for the target machine learning model and a plurality of feature values of the plurality of machine learning features. For example, a plurality of feature values may be identified based on the training inputs from the training data. For example, a training input may correspond to an input data object. The feature values may be extracted from each input data object identified by the training inputs of the training data.

In some embodiments, a plurality of feature association metrics for the machine learning features is generated based on a comparison between the plurality of feature values and a training output of the training data. For example, a statistical analysis may be performed, such as a correlation and/or odds ratio analysis, to generate a feature association metric for at least a subset of the machine learning features. The label-based similarity vector may be based on the plurality of feature association metrics. For example, the plurality of feature association metrics may be leveraged to identify the one or more relevant features for the label-based similarity vector. For instance, the one or more relevant features may include a subset (e.g., top 5, 10, etc.) of the machine learning features that is associated with the highest, lowest, and/or the like feature association metrics. By way of example, the one or more relevant features may be associated with feature association metrics with the highest magnitude and/or most significant p-value. In some examples, the label-based similarity vector may include one or more of the feature association metrics that satisfy a relative similarity threshold.

In some embodiments, the term "aggregated feature relevance score" refers to a data entity that describes a measure of a machine learning feature's relevance to a target machine learning model. In some examples, an aggregated feature relevance score May include a plurality of aggregated similarity scores for a machine learning feature. For instance, an aggregated feature relevance score for a machine learning feature may include an aggregation (e.g., multiplication, addition, dot product, etc.) of each similarity score corresponding to the machine learning feature from each of a plurality of similarity vectors (e.g., domain-based similarity vector, problem-based similarity vector, historical model-based similarity vector, label-based similarity vector, and/or the like).

In some embodiments, the term "scaled feature relevance score" refers to a data entity that describes a scaled measure of a machine learning feature's relevance to a target machine learning model. A scaled feature relevance score may include an aggregated feature relevance score that is scaled by one or more scaling parameters. For example, a plurality of similarity scores from the plurality of similarity vectors may be aggregated using one or more scaling parameters to normalize the weights of different similarity analyses. The plurality of similarity scores may be normalized using scaling parameters. The scaling parameters may include a degree on a scale of 0 to 1. In some examples, one or more different scaling parameters may be assigned to each machine learning feature and/or similarity vector. The scaled feature relevance score, $R_f$, may be expressed as:

$$R_f = \omega_1 \times \omega_{1c} \times \text{Domain Similarity} + \omega_2 \times \omega_{2c} \times \text{Problem Similarity} +$$
$$\omega_3 \times \omega_{3c} \times \text{Previous Models Similarity} + \omega_4 \times \omega_{4c} \times \text{Label Association}$$

where $\omega_n$ are tunable weights to allow change for recommendation source importance based on the user preference and $\omega_{nc}$ is a quality score of each which allow to penalize the sources with a lower quality in the ranking list.

In some embodiments, the term "scaling parameter" refers to a data entity that describes a relative weight for a machine learning feature and/or a similarity score.

In some embodiments, a scaling parameter includes a tunable similarity importance score that corresponds to a similarity analysis. The tunable similarity important score may be leveraged to scale a similarity score generated in accordance with a particular similarity analysis to adjust the impact of a similarity analysis on the scaled feature relevance score. By way of example, a different tunable similarity important score may correspond to each of the domain-based similarity vector, problem-based similarity vector, historical model-based similarity vector, label-based similarity vector, and/or the like to individually adjust similarity scores thereof. In some examples, the tunable similarity importance score may be selected by a user for each similarity analysis.

In some embodiments, a scaling parameter includes one or more quality metrics that corresponds to a machine learning feature. The quality metrics may be leveraged to scale the similarity scores of a machine learning feature based on a measure of the feature's quality with respect to a particular model domain. The feature quality, for example, may be based on a feature coverage. A feature coverage may be indicative of a percentage of input data objects within a model domain that include a feature value for a respective machine learning feature. For instance, the feature coverage may be indicative of a missingness and/or a representation of a machine learning feature in a dataset of input data objects.

In some embodiments, the term "predictive feature set" refers to a data entity that describes one or more machine learning features for a target machine learning model. The predictive feature set may be indicative of an optimal feature set for a target machine learning model. In some examples, the predictive feature set may include a selected number (e.g., top 10, etc.) of machine learning features. The selected number of machine learning feature may be based on user input.

IV. Overview

Embodiments of the present disclosure present feature engineering techniques that improve feature discovery operations for machine learning models. To do so, the present disclosure provides a multi-stage feature scoring technique for generating a plurality of similarity scores for a variety of machine learning features of a feature datastore. Some embodiments of the present disclosure provide a plurality of interconnected scoring techniques that each automatically and individually score a machine learning feature based on a different aspect of a target machine learning model. Using some of the techniques of the present disclosure, these scores may be aggregated to generate holistic relevance measures for features from the feature datastore with respect to multiple facets of a target machine learning model. In this way, some of the embodiments of the present disclosure provide improved feature engineering techniques that improve upon conventional feature engineering techniques by automatically generating relevant feature sets for a target machine learning model that include features tailored to each aspect of the machine learning model. This mitigates the requirement for specific knowledge of the features within a feature datastore, while surfacing features for model development that are traditionally unknown, uncorrelated to a specific task, and/or would otherwise not be considered. Ultimately, the feature engineering techniques of the present disclosure may be practically applied in a machine learning model development environment to improve machine learning performance and feature interpretability of machine learning models, among other technical advantages.

Some embodiments of the present disclosure provide feature discovery techniques for generating automatic feature recommendations for target machine learning models. Unlike traditional feature discovery techniques, some of the feature discovery techniques of the present disclosure may allow users to identify features from a feature datastore based on project requirements and/or user preferences. To do so, some of the feature discovery techniques of the present disclosure implement one or more keyword-based filters, statistical methods, similarity analyses, semantic analyses, and/or other techniques to generate a diverse set of similarity scores that are tailored to multiple aspects of the machine learning model. For example, the similarity scores may include a domain-based similarity score that is tailored to a model domain of the target machine learning model, a problem-based similarity score that is tailored to a problem solved by the target machine learning model, a historical model-based similarity score that is tailored to historical models related to the target machine learning model, and/or a label-based similarity score that is tailored to the training data for the target machine learning model. Unlike traditional feature discovery techniques, these similarity scores may be aggregated and/or individually analyzed to generate feature recommendations that are specifically tailored to different components of a target machine learning model without knowledge of a feature datastore and/or the features therein. In this way, some of the embodiment of the present disclosure may standardize and/or automate the feature engineering and/or feature selection processes for a machine learning model to address the growing complexities associated with robust and comprehensive machine leaning model feature datastores.

Some embodiments of the present disclosure provide approaches to utilize feature datastores that improve upon traditional feature datastore searching techniques. For instance, traditional feature store solutions are focused on data sharing, enquiring, access, and availability, but assume that the users have knowledge of the relevant features for a machine learning model before the development of the model. However, in a large feature datastore where the number of features may be overwhelming, selecting relevant features that may be useful for a target machine learning model is challenging, vague, and subject to errors. Some of the feature engineering techniques solve these technical problems by generating and providing a predictive feature set for a target machine learning model based on various attributes of the model. Some of the feature engineering techniques are based on a feature's relevance and/or usefulness to a machine learning problem, training data, and/or other aspects of the model. In this way, a robust feature datastore may be efficiently searched based on specific aspects of a machine learning model (e.g., as opposed to a generic search string, etc.) to automatically generate a list of relevant features that are tailored to the needs of a particular machine learning project.

Example inventive and technologically advantageous embodiments of the present disclosure include: (i) feature engineering techniques for generating feature sets for machine learning model development; (ii) feature discovery techniques for recommending relevant features tailored to different aspects of a machine learning model; (iii) similarity scoring techniques for generating a diverse set of similarity scores between a machine learning model and various features of a feature datastore; and (iv) holistic evaluation techniques for holistically evaluating a feature relevance with respect to various facets of a machine learning model, among other advantages.

V. Example System Operations

As indicated, various embodiments of the present disclosure make important technical contributions to feature engineering techniques for machine learning models. In particular, systems and methods are disclosed herein that implement feature engineering techniques for holistically evaluating features of a feature datastore with respect to various aspects of a machine learning model. This, in turn, may provide improved feature recommendations for machine learning models that may ultimately improve machine learning model performance and feature interpretability among other technical advantages. An example feature engineering technique will now further be described with reference to FIG. 3.

Figure 3:
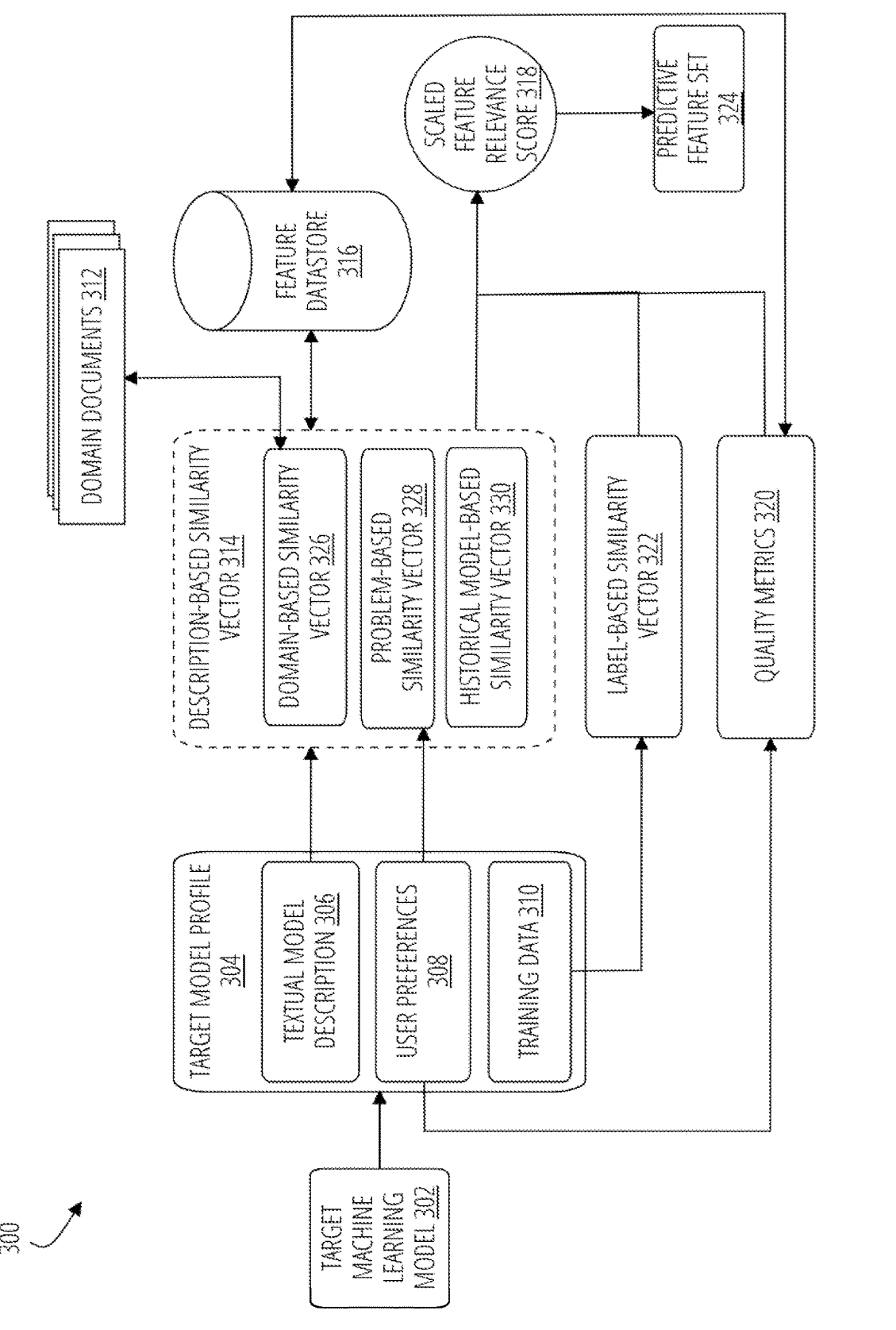
FIG. 3 is a dataflow diagram showing example data structures for engineering features of a target machine learning model in accordance with some embodiments discussed herein.

FIG. 3 is a dataflow diagram 300 showing example data structures for engineering features of a target machine learning model in accordance with some embodiments discussed herein. The dataflow diagram 300 depicts a set of data structures and modules for orchestrating the execution of a feature engineering task. In some embodiments, the feature engineering task is performed to generate a predictive feature set 324 for a target machine learning model 302.

In some embodiments, the target machine learning model 302 is a data entity that describes parameters, hyper-parameters, and/or defined operations of a rules-based and/or machine learning model (e.g., model including at least one of one or more rule-based layers, one or more layers that depend on trained parameters, coefficients, and/or the like). The target machine learning model 302 may include any type of model configured, trained, and/or the like to generate an output for a predictive and/or classification task in any predictive domain. The target machine learning model 302 may include one or more of any type of machine learning model including one or more supervised, unsupervised, semi-supervised, reinforcement learning models, and/or the like. For instance, the target machine learning model 302 may include a supervised model that may be trained using training data 310 configured by a user. In some examples, the target machine learning model 302 may include multiple models configured to perform one or more different stages of a classification and/or prediction process.

In some embodiments, the target machine learning model 302 is designed and/or trained for any purpose depending on the prediction domain. In some examples, the target machine learning model 302 may be trained to generate a classification and/or prediction for an input data object based one or more features of the input data object. For instance, the target machine learning model 302 may include a plurality of weighted features that are leveraged to generate a classification, prediction, and/or the like for an input data object. In some examples, the features considered by the target machine learning model 302 may be selected during a design phase of the model through a features discovery process.

In some embodiments, a machine learning feature is a data entity that describes a feature that may be considered by a machine learning model to generate an output. In some examples, a machine learning feature may include a recorded feature that is stored, maintained, and/or otherwise accessible through a feature datastore 316. For example, a feature datastore 316 may include hundreds, thousands, and/or more features, a subset of which may be predictive of a desired output for a target machine learning model 302. During model development, a user may face challenges on selecting features to be considered by the target machine learning model 302. In some examples, using some of the techniques of the present disclosure, a predictive feature set 324 may be generated from the feature datastore 316 for use in developing the target machine learning model 302 based on feature metadata corresponding to a plurality of machine learning features of the feature datastore 316.

In some embodiments, the feature metadata is indicative of one or more attributes for a machine learning feature, such as a textual feature description, a number of machine learning models, a feature domain, feature datatype, a feature coverage with respect to one or more training dataset, and/or any other data that may be recorded for a machine learning feature and/or indicative of a characteristic of the machine learning feature. In some embodiments, a textual feature description is a data entity that represents an aspect of the feature metadata for a particular machine learning feature. The textual feature description may include natural language and/or structured language text that describes, in plain text, one or more aspects of the machine learning feature.

As described herein, discovering features may be time consuming, resource intensive, and subject to inaccuracies, inefficiencies, and/or other technical problems. For example, due to a large number of available features in a domain and frequent updates to the large number of features, an optimal feature set for the target machine learning model 302 may include features that are hidden, unknown, and/or lack an existing correlation with a particular task. Some techniques of the present disclosure enable the efficient design of the target machine learning model 302 by leveraging a target model profile 304 to generate a predictive feature set 324 for the target machine learning model 302. The predictive feature set 324 may be generated to improve model performance based on the goals of the model and other aspects of the target model profile 304.

In some embodiments, the predictive feature set 324 is a data entity that describes one or more machine learning features for the target machine learning model 302. The predictive feature set 324 may be indicative of an optimal feature set for the target machine learning model 302. In some examples, the predictive feature set 324 may include a selected number (e.g., top 10, etc.) of machine learning features from the feature datastore 316. The selected number of machine learning features may be based on user input.

In some embodiments, the predictive feature set 324 is generated for the target machine learning model 302 based on the target model profile 304 for the target machine learning model 302 and/or feature metadata from the feature datastore 316. For instance, the target model profile 304 may be generated, received, and/or maintained for the target machine learning model 302. In some examples, the target model profile 304 may be received through user input, as described herein.

In some embodiments, the target model profile 304 is a data entity that describes one or more targeted aspects for a target machine learning model 302. A target model profile 304 may include one or more model attributes. Each model attribute may be indicative of a targeted aspect of the target machine learning model 302. For instance, the target model profile 304 may include a textual model description 306 that records a purpose for the target machine learning model 302. In addition, or alternatively, the target model profile 304 may include a model domain that is indicative of prediction and/or classification category for the target machine learning model 302. A prediction and/or classification category, for example, may be indicative of a technical and/or knowledge domain associated with the target machine learning model 302 and/or an output thereof. By way of example, a model domain may be indicative of a healthcare provider recommendation domain that leverage a corpus of knowledge considered by health care professionals to provide a healthcare provider recommendation. In addition, or alternatively, the model domain may be indicative of a financial services prediction domain, a media recommendation domain, a real estate prediction domain, an image classification domain, and/or the like.

In some embodiments, the one or more model attributes include structural attributes, such as a model type, model objective, and/or user preferences 308. The model type may include an output type for the target machine learning model 302, such as a classification type (e.g., configured to output a predictive classification for an input data object, etc.), a prediction type (e.g., configured to output a probability indicative of a likelihood of an event, etc.), a recommendation type (e.g., configured to provide a list of outputs that satisfy criteria, etc.), a regression type, and/or the like. The model objective may be indicative of an output class for a target machine learning model 302, such as a binary class, a probability class, a segmentation class, and/or the like. The user preferences 308 may be indicative of one or more feature preferences for a target machine learning model 302. The user preferences 308, for example, may be indicative of one or more feature data source requirements, such as a source refresh frequency (e.g., weekly, monthly, etc.), a dataset type (e.g., tabular, image, natural language text, etc.), one or more specified data sources (e.g., one or more of member claims, member engagements, member utilization, member provider, member medical profile, member socio-eco, member contract, and/or member time series events, etc. for a clinical domain), and/or the like. In some examples, the user preferences 308 may be indicative of one or more feature preferences, such as a feature coverage (e.g., percentage of data objects within a dataset that include a feature value for a particular feature, etc.), and/or the like. In some examples, the user preferences 308 may include one or more tunable similarity importance scores, as described herein.

In some embodiments, a target model profile 304 is provided by a user. For instance, the one or more model attributes may be provided through a user interface. The user interface, for instance, may include model development user interface that is configured to interact with a user to generate the target machine learning model 302 and/or one or more aspects thereof. Using the development user interface, a user may specify one or more of the model attributes. In some examples, the user interface (and/or one or more hosting servers) may generate the target model profile 304 based on user input to the user interface. Using some of the techniques of the present disclosure, the target model profile 304 may be leveraged to generate the predictive feature set 324. The user interface may respond to the user input with a rendering of the predictive feature set 324 and/or an indication of the relevance of each relevant feature in the predictive feature set 324.

In some embodiments, the textual model description 306 is an aspect of the target model profile 304. The textual model description 306 may include natural language and/or structured language text that describes, in plain text, one or more aspects of the target machine learning model 302. The textual model description 306 may be provided by a user to describe one or more model objectives, inputs, outputs, domain, and/or the like in plain text. For instance, the textual model description 306 may include natural language text. By way of example, in a clinical prediction domain, a textual model description 306 may be "This model aims to find the most relevant provider based on the historical provider performance training data."

In some embodiments, the training data 310 is a data entity that describes training data 310 for the target machine learning model 302. The training data 310 may include a supervised training dataset that includes labeled training entities. For instance, the training data 310 may include a plurality of training input-output pairs. Each training input-output pair may include a training input and a corresponding training output. A training input, for example, may include a data entity that may be processed by a machine learning model to generate an output, such as a classification, a prediction, and/or the like, for the training input. The training output may include a ground truth for the training input.

In some embodiments, training data 310 includes a portion of the target model profile 304. For instance, training data 310 may be selected by a user through a development user interface. By way of example, in the event that a user is developing a model for a healthcare provider recommendation, the user may select training data 310 which includes historical data and/or an identification (e.g., a member identifier, etc.) of one or more members associated with a healthcare provider. In addition, the user may select one or more target labels that may be used for training the target machine learning model 302 based on the historical and/or member data. The target labels may include binary labels (1/0) that indicate whether the performance of a previously recommended provider was high (1) or low (0).

In some embodiments, a training input is a data entity that describes an input for a target machine learning model. A training input may include any type of input based on the target machine learning model 302. In some examples, the training input may include an identifier (e.g., a member identifier, an employee number, etc) that corresponds to a data object that includes a plurality of object feature values for a data entity (e.g., member, employee, etc.). The plurality of object feature values, for example, may include respective values corresponding to a machine learning feature for a data entity. By way of example, a feature value may be indicative of a presence of a machine learning feature (e.g., a binary value), a degree of the machine learning feature (e.g., a likelihood, probability, etc.), and/or the count (e.g., number of occurrences, etc.) for a machine learning feature. In some examples, the training input may include a corresponding training output that may be used to correlate the plurality of object feature values to an output for a machine learning model through one or more supervised training techniques.

In some embodiments, the training output is a data entity that describes an output for the target machine learning model 302. The training output may include a ground truth label for a training input. The training output, for example, may include a binary label, a degree, and/or any other data entity that is configured to represent a desired output of a target machine learning model.

In some embodiments, the predictive feature set 324 is based on one or more aspects of the target model profile 304 and/or the feature datastore 316. For example, the target model profile 304 may include one or more user preferences 308. The user preferences 308 may be indicative of one or more criteria on the feature types and/or data sources from the feature datastore 316. In some examples, a plurality of features from the feature datastore 316 may be validated with respect to the one or more feature criteria before the feature are considered for a predictive feature set 324.

In some embodiments, the plurality of features is validated based on quality metrics 320. For example, the quality metrics 320 may be indicative of one or more quality scores, such as coverage metrics for a respective feature. In some examples, the one or more feature criteria may include a coverage threshold that is indicative of a threshold (e.g., minimum, maximum, etc.) feature coverage for a respective machine learning feature with respect to input data objects of the training data 310. The coverage threshold may be indicative of a threshold coverage percentage, such as 50%, 80%, and/or the like. In some examples, the coverage metrics for a particular machine learning feature, f, may be measured by:

$$100 * \left( 1 - \frac{missingData_f}{count_m} \right)$$

Where missing $Data_f$ may be a number of data objects that have no data (e.g., no feature values, etc.) for the feature f and $count_m$ may be a number of data objects in the training data 310. In some examples, the quality metrics 320 may be leveraged to remove one or more machine learning features from consideration for the target machine learning model 302. In some examples, the quality metrics 320 may be leveraged as a scaling parameter for generating a scaled feature relevance score for the feature, f, as described herein.

In some embodiments, the quality metrics 320 include a refresh frequency. For instance, the one or more feature criteria may be indicative of one or more specific data frequency rates. For example, real time model may rely on high refresh frequency data sources. By way of example, if a target machine learning model 302 is executed on a monthly basis, the feature criteria may be indicative of a monthly refresh frequency. In some examples, the quality metrics 320 may be leveraged to remove one or more machine learning features from consideration for the target machine learning model 302 if they are associated with a refresh frequency that does not satisfy the one or more feature criteria.

In some embodiments, the quality metrics 320 include a response time. For instance, the one or more feature criteria may be indicative of one or more specific retrieving/response times. For example, machine learning features may be associated with data sources that have a low response and/or high latency. In real time models, such machine learning features may be problematic. In some examples, the quality metrics 320 may be leveraged to remove one or more machine learning features from consideration for the target machine learning model 302 in the event that they are associated with a low response and/or high latency time that do not satisfy the one or more feature criteria.

In some embodiments, the one or more aspects of the target model profile 304 may be represented by one or more vectorized representations. For instance, one or more vectorized representations may be generated for one or more aspects of the target model profile 304 for comparison with one or more machine learning features from the feature datastore 316. For instance, the vectorized representations may be compared against different vectorized representations that may be correlated with the machine learning features to measure a similarity between different aspects of the target machine learning model 302 and the machine learning features using vector similarity models.

By way of example, the one or more vectorized representations may include a model description vector corresponding to the textual model description 306 for the target machine learning model 302. In some examples, a model description vector may be generated from the textual model description 306 for the target machine learning model.

In some embodiments, the model description vector is a data entity that represents a vectorized representation of the textual model description 306. The model description vector may be generated from the textual model description 306 by applying a language processing model to the textual model description 306.

In some embodiments, the language processing model is a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). For instance, the language processing model may include a vectorization model configured to generate a vectorized representation from textual data. In some examples, the language processing model may include a natural language statistical model, such as a term frequency-inverse document frequency (TF-IDF) algorithm, word2vec, CountVectorizer, bag-of-words, and/or the like. In some examples, the language processing model may include a machine learning natural language model, such as a bidirectional encoder configured to generate a bidirectional encoder representation from a transformer (BERT) representation of the textual data. As will be understood by one of ordinary skill in the art, a language processing model may include any type of vectorization and/or encoding model configured to generate a vectorized and/or encoded representation from textual data.

In some embodiments, one or more similarity vectors are generated for the target machine learning model based on the one or more aspects of the target model profile 304 and/or one or more vectorized representations thereof.

In some embodiments, a similarity vector is a data entity that describes one or more relevant features for the target machine learning model 302. A similarity vector may include a plurality of relevant features and/or a similarity score corresponding to each of the plurality of relevant features. Using some of the techniques of the present disclosure, a plurality of similarity vectors may be generated for the target machine learning model 302 based on one or more different criteria. Each similarity vector may include one or more different relevant features and/or similarity scores.

In some embodiments, a relevant feature a data entity that describes a machine learning feature of a similarity vector. A relevant feature may include a machine learning feature that is associated with a similarity score that satisfies a relative similarity threshold.

In some embodiments, the relative similarity threshold is a data entity that describes a constraint for determining relevant features of a similarity vector. A relative similarity threshold may include a count threshold and/or a score threshold. For example, a count threshold may be indicative of a limitation on the number of relevant features (e.g., a maximum number, a minimum number, etc.) for a similarity vector. The count threshold, for example, may be set by a user and/or include a static number, such as 3, 5, 10, and/or the like for constraining a size of a similarity vector for the target machine learning model 302. In addition, or alternatively, a score threshold may be indicative of a limitation on a similarity score (e.g., a maximum score, a minimum score, etc.) for a relevant feature to be included in a similarity vector. The score threshold, for example, may be set by a user and/or include a static score, such as 0.1, 0.5, 0.8, and/or the like for constraining a relevance of relevant features in a similarity vector for the target machine learning model.

In some embodiments, a similarity score is a data entity that describes a similarity between a machine learning feature and an aspect of the target machine learning model 302. A similarity score may include any type of value representative of a relative similarity between a machine learning feature and an aspect of the target machine learning model 302. For instance, the similarity score may include a real number, a degree (e.g., a number between 0 and 1, etc.), and binary value, and/or the like. In some examples, a similarity score may be based on a type of similarity vector. For example, as described herein, a label-based similarity vector 322 may include a plurality of similarity scores that are indicative of a magnitude of a correlation and/or odds ratio analysis for a plurality of machine learning features. In addition, or alternatively, a description-based similarity vector 314 may include a plurality of similarity scores that are indicative of a vector similarity between two vectors associated with the target machine learning model 302 and a machine learning feature. In some examples, a similarity score may be generated using a vector similarity model.

In some embodiments, a vector similarity model is a data entity that describes parameters, hyper-parameters, and/or defined operations of a rules-based, statistical, and/or machine learning model (e.g., model including at least one of one or more rule-based layers, one or more layers that depend on trained parameters, coefficients, and/or the like). A vector similarity model may be configured to generate a similarity score between two vectors. By way of example, a vector similarity model may include a cosine similarity model configured to generate a cosine similarity between two vectors. In addition, or alternatively, a vector similarity model may include a Jaccard similarity algorithm, a BERT embedding similarity algorithm, a k-means and/or Siamese Manhattan LSTM, and/or any other similarity algorithm. As will be understood by one of ordinary skill in the art, a vector similarity model may include any type of similarity algorithm and/or encoding model configured to generate a vectorized representation from a textual data.

In some embodiments, the similarity vectors for the target machine learning model 302 include one or more description-based similarity vectors 314. The one or more description-based similarity vectors 314 may be generated based on the model description vector of the target model profile 304. Each description-based similarity vector of the one or more description-based similarity vectors 314 may include one or more of a plurality of similarity scores for a plurality of machine learning features from the feature datastore 316. In some examples, each of the plurality of similarity scores is based on the model description vector.

In some embodiments, the one or more description-based similarity vectors 314 include a domain-based similarity vector 326, a problem-based similarity vector 328, and/or a historical model-based similarity vector 330. Each of the description-based similarity vector 314 may be generated in accordance with a different similarity analysis and may include one or more different machine learning features from the feature datastore 316 and/or one or more different similarity scores corresponding thereto. For example, the different similarity analyses may be configured to identify and/or highlight different machine learning features from the feature datastore 316 based on one or more different criteria for the target machine learning model 302. In this manner, using some of the techniques of the present disclosure, a plurality of machine learning features may be identified that holistically account for a plurality of multi-faceted aspects of the target machine learning model 302.

In some embodiments, a description-based similarity vector 314 is a data entity that describes a similarity vector that is based on a textual model description for the target machine learning model 302. A description-based similarity vector 314 may include a plurality of relevant features with a plurality of corresponding similarity scores. Each similarity score may be based on a comparison between a model description vector and another vector that may be correlated to a machine learning feature. By way of example, a description-based similarity vector 314 may include (i) a domain-based similarity vector 326 that includes a plurality of similarity scores each based on a comparison between a model description vector and one or more domain documents 312 associated with a model domain, (ii) a problem-based similarity vector 328 that includes a plurality of similarity scores each based on a comparison between a model description vector and one or more feature description vectors, and/or (iii) a historical model-based similarity vector 330 that includes a plurality of similarity scores each based on a comparison between a model description vector and one or more model description vectors.

In some embodiments, the description-based similarity vector 314 includes a problem-based similarity vector. The problem-based similarity vector may include a plurality of problem-based similarity scores. The plurality of problem-based similarity scores may be based on a comparison between the model description vector of the target machine learning model 302 and a plurality of feature description vectors corresponding to a plurality of textual feature descriptions for the plurality of machine learning features from the feature datastore 316 (e.g., a plurality of validated features, etc.).

In some embodiments, the feature description vector is a data entity that represents a vectorized representation of a textual feature description. A feature description vector may be generated from feature metadata, such as the textual feature description, by applying the language processing model to the feature metadata (e.g., textual feature description). In some examples, the same language processing model is leveraged to generate the model description vector and the feature description vector. In some examples, a plurality of feature description vectors may be generated, using the language processing model, based on the plurality of textual feature descriptions for the plurality of machine learning features (e.g., validated features, etc.).

In some embodiments, a plurality of problem-based similarity scores is generated, using the vector similarity model, based on a comparison between the model description vector and the plurality of feature description vectors. In some examples, the problem-based similarity vector 328 may be generated based on the plurality of problem-based similarity scores. For example, the problem-based similarity vector may include one or more similarity scores (and/or corresponding relevant features) of the plurality of problem-based similarity scores that satisfy a relative similarity threshold.

In some embodiments, the problem-based similarity vector 328 is a data entity that describes a type of description-based similarity vector 314. The problem-based similarity vector 328 may include a plurality of relevant features with a plurality of corresponding similarity scores. The corresponding similarity scores may include problem-based similarity scores that are indicative of a similarity between a model description vector and a plurality of feature description vectors that correspond to a plurality of textual feature descriptions for the plurality of machine learning features. For instance, a textual feature description from feature metadata may be vectorized, using the language processing model, to generate a plurality of feature description vectors. A problem-based similarity score may be generated, using the vector similarity model, between the model description vector and each feature description vector to generate the plurality of problem-based similarity scores. The plurality of problem-based similarity scores may be leveraged to identify the one or more relevant features of the problem-based similarity vector 328. For example, the one or more relevant features may include a subset (e.g., top 5, 10, etc.) of the machine learning features that is associated with the highest, lowest, and/or the like problem-based similarity scores. In some examples, the problem-based similarity vector 328 may include one or more problem-based similarity scores of the plurality of problem-based similarity scores that satisfy a relative similarity threshold.

In some embodiments, the description-based similarity vector 314 includes a domain-based similarity vector 326. The domain-based similarity vector 326 may include a plurality of domain-based similarity scores. The domain-based similarity scores may be based on a comparison between one or more domain documents 312 and/or a plurality of feature description vectors for the machine learning features (e.g., validated features, etc.) of the feature datastore 316.

In some embodiments, the one or more domain documents 312 are identified from a plurality of natural language documents corresponding to a model domain. For instance, the one or more domain documents 312 may include one or more relevant natural language documents that are identified from a plurality of natural language documents based on a plurality of document similarity scores. The plurality of domain similarity scores may be based on a comparison between the model description vector for the target machine learning model 302 and a plurality of document vectors corresponding to the plurality of natural language documents for the model domain. In some examples, the plurality of domain-based similarity scores is generated, using a vector similarity model, based on a comparison between (i) one or more document vectors of the plurality of document vectors that correspond to the one or more relevant natural language documents and (ii) a plurality of feature description vectors corresponding to the plurality of textual feature descriptions for the plurality of machine learning features of the feature datastore 316. In some examples, the domain-based similarity vector 326 may be generated based on the plurality of description-based similarity scores. For example, the domain-based similarity vector 326 may include one or more domain-based similarity scores of the plurality of domain-based similarity scores that satisfy a relative similarity threshold.

In some embodiments, the domain-based similarity vector 326 is a data entity that describes a type of description-based similarity vector 314. The domain-based similarity vector 326 may include a plurality of relevant features with a plurality of corresponding similarity scores. The corresponding similarity scores may include domain-based similarity scores that are indicative of a similarity between one or more relevant documents from a model domain and feature metadata corresponding to the plurality of relevant features.

In some embodiments, the plurality of domain-based similarity scores is each based on a comparison between a model description vector and one or more domain documents 312 associated with the model domain. The one or more domain documents 312, for example, may include one or more natural language domain documents that are associated with model domain. In some examples, the one or more domain documents 312 may include one or more relevant natural language documents that are identified from a plurality of natural language documents for the model domain.

In some embodiments, one or more relevant natural language documents are identified from a plurality of natural language documents for the model domain based on a similarity score between each document and a model description vector. For example, a plurality of document similarity scores may be generated based on a comparison between a plurality of document vectors (e.g., a vectorized representation of a natural language document, etc.) that correspond to the natural language documents and the model description vector. By way of example, a vectorization transformation may be executed, using a language processing model, such as TF-IDF, and/or the like, for both the textual model description and a plurality of documents in a domain knowledge corpus of documents. A document similarity score may be generated, using a vector similarity model, such as a cosine similarity function, and/or the like, between each document vector and the model description vector to generate a plurality document similarity scores. The plurality of document similarity scores may be leveraged to identify the one or more relevant natural language documents. For example, the one or more relevant natural language documents may include a subset (e.g., top 5, 10, etc.) of the documents that is associated with the highest, lowest, and/or the like document similarity scores.

In some embodiments, the plurality of domain-based similarity scores is generated based on a comparison between one or more document vectors that correspond to the one or more relevant natural language documents and a plurality of feature description vectors that correspond to a plurality of textual feature descriptions for the plurality of machine learning features. For instance, a textual feature description from feature metadata may be vectorized, using the language processing model, to generate a plurality of feature description vectors, as described herein. A domain-based similarity score may be generated, using the vector similarity model, between the one or more document vectors and each feature description vector to generate the plurality of domain-based similarity scores. The plurality of domain-based similarity scores may be leveraged to identify the one or more relevant features of the domain-based similarity vector. For example, the one or more relevant features may include a subset (e.g., top 5, 10, etc.) of the machine learning features that is associated with the highest, lowest, and/or the like domain-based similarity scores. In some examples, the domain-based similarity vector may include one or more domain-based similarity scores of the plurality of domain-based similarity scores that satisfy a relative similarity threshold.

In some embodiments, the description-based similarity vector 314 includes a historical model-based similarity vector 330. The historical model-based similarity vector 330 may include a plurality of historical model-based similarity scores. The plurality of historical model-based similarity scores may be based on a comparison between the model description vector of the target machine learning model 302 and a plurality of model vectors corresponding to a plurality of historical machine learning models.

In some embodiments, the historical model-based similarity vector 330 is generated based on one or more relevant models from the plurality of historical machine learning models. For example, the one or more relevant models may be identified from the plurality of historical machine learning models based on a plurality of model similarity scores. In some examples, the plurality of model similarity scores may be based on a comparison between the model description vector and a plurality of model vectors corresponding to a plurality of historical model descriptions for the plurality of historical machine learning models. In some examples, the historical model-based similarity vector 330 may be generated based on the one or more relevant models and the plurality of model similarity scores.

In some embodiments, the historical model-based similarity vector 330 is a data entity that describes a type of description-based similarity vector. The historical model-based similarity vector 330 may include a plurality of relevant features with a plurality of corresponding similarity scores. The corresponding similarity scores may include historical model-based similarity scores that are indicative of a similarity between one or more relevant models from a plurality of historical machine learning models and the textual model description.

In some embodiments, the plurality of historical model-based similarity scores is each based on a comparison between the model description vector and the one or more relevant models. The one or more relevant models, for example, may include one or more historical machine learning models that are associated with one or more of the plurality of machine learning features. In some examples, each historical machine learning model may be associated with model metadata, such as a textual model description, a model type, a model domain, and/or any other model attribute described herein.

In some embodiments, one or more relevant models are identified from the plurality of historical machine learning models based on a similarity score between each model and a model description vector. For example, a plurality of model similarity scores may be generated based on a comparison between a plurality of model vectors (e.g., a vectorized representation of the model metadata, etc.) that correspond to the historical machine learning models and the model description vector. By way of example, a vectorization transformation may be executed, using the language processing model, for both the textual model description and the model metadata for each of the plurality of historical machine learning models. A model similarity score may be generated, using the vector similarity model, between each model vector and the model description vector to generate a plurality of model similarity scores. The plurality of model similarity scores may be leveraged to identify the one or more relevant models. For example, the one or more relevant models may include a subset (e.g., top 5, 10, etc.) of the historical machine learning models that is associated with the highest, lowest, and/or the like model similarity scores.

In some embodiments, the one or more relevant features of the historical model-based similarity vector include one or more machine learning features associated with (e.g., used in, etc.) the one or more relevant models. In some examples, the historical model-based similarity score for each relevant feature may include the model similarity score corresponding to the relevant model associated with the relevant feature.

In some embodiments, the similarity vectors for the target machine learning model 302 include one or more label-based similarity vectors 322. For example, a label-based similarity vector 322 may be generated based on a comparison between the training data 310 for the target machine learning model 302 and a plurality of feature values of the plurality of machine learning features. For example, the training data 310 may include one or more training inputs and/or one or more training outputs, as described herein. In some examples, a plurality of feature values may be identified based on the one or more training inputs. For example, a feature value to a data entity that represents a particular feature value corresponding a machine learning feature for an input data object. For example, a feature value may be indicative of a presence of a machine learning feature (e.g., a binary value), a degree of the machine learning feature (e.g., a likelihood, probability, etc.), a count (e.g., number of occurrence, etc.), and/or any other data type that is indicative of a particular value for a machine learning feature. In some examples, a plurality of feature association metrics may be generated for the plurality of machine learning features based on a comparison between the plurality of feature values and the one or more training outputs. In some examples, the label-based similarity vector 322 may be generated based on the plurality of feature association metrics. For example, the label-based similarity vector 322 may include cone or more of the feature association metrics that satisfy a relative similarity threshold.

In some embodiments, the label-based similarity vector 322 is a data entity that describes a similarity vector that is based on training data 310 for the target machine learning model 302. A label-based similarity vector 322 may include a plurality of relevant features with a plurality of corresponding similarity scores. The corresponding similarity scores may include feature association metric scores that are indicative of an association between the training data 310 and/or one or more machine learning features.

In some embodiments, the label-based similarity vector 322 is based on a comparison between the training data 310 for the target machine learning model and a plurality of feature values of the plurality of machine learning features. For example, a plurality of feature values may be identified based on the training inputs from the training data 310. For example, a training input may correspond to an input data object. The feature values may be extracted from each input data object identified by the training inputs of the training data 310.

In some embodiments, a plurality of feature association metrics for the machine learning features is generated based on a comparison between the plurality of feature values and a training output of the training data 310. For example, a statistical analysis may be performed, such as a correlation and/or odds ratio analysis, to generate a feature association metric for at least a subset of the machine learning features. The label-based similarity vector 322 may be based on the plurality of feature association metrics. For example, the plurality of feature association metrics may be leveraged to identify the one or more relevant features for the label-based similarity vector 322. For instance, the one or more relevant features may include a subset (e.g., top 5, 10, etc.) of the machine learning features that is associated with the highest, lowest, and/or the like feature association metrics. By way of example, the one or more relevant features may be associated with feature association metrics with the highest magnitude and/or most significant p-value. In some examples, the label-based similarity vector 322 may include one or more of the feature association metrics that satisfy a relative similarity threshold.

In some embodiments, the predictive feature set 324 for the target machine learning model 302 may be provided based on the one or more description-based similarity vectors 314 and the label-based similarity vector 322. The predictive feature set 324, for example, may be generated based on a plurality of aggregated feature relevance scores. The plurality of aggregated feature relevance scores may be generated for a subset of machine learning features from the plurality of machine learning features based on an aggregation of the domain-based similarity vector 326, the problem-based similarity vector 328, the historical model-based similarity vector 330, and/or the label-based similarity vector 322. In some examples, the domain-based similarity vector 326, the problem-based similarity vector 328, the historical model-based similarity vector 330, and/or the label-based similarity vector 322 may be associated with one or more different machine learning features from the plurality of machine learning features. In some examples, the subset of machine learning features from the plurality of machine learning features includes one or more machine learning features from each of the domain-based similarity vector 326, the problem-based similarity vector 328, the historical model-based similarity vector 330, and the label-based similarity vector 322.

In some embodiments, aggregated feature relevance score is a data entity that describes a measure of a machine learning feature's relevance to the target machine learning model 302. In some examples, an aggregated feature relevance score may include a plurality of aggregated similarity scores for a machine learning feature. For instance, an aggregated feature relevance score for a machine learning feature may include an aggregation (e.g., multiplication, addition, dot product, etc.) of each similarity score corresponding to a machine learning feature from each of a plurality of similarity vectors (e.g., domain-based similarity vector 326, problem-based similarity vector 328, historical model-based similarity vector 330, label-based similarity vector 322, and/or the like).

In some embodiments, the predictive feature set 324 for the target machine learning model 302 may be generated based on the plurality of scaled feature relevance scores 318. The scaled feature relevance score 318, for example, may be generated by applying one or more scaling parameters to the plurality of aggregated feature relevance scores. In some examples, the one or more scaling parameters may include one or more user defined parameters indicative of a user preference for each of the domain-based similarity vector 326, the problem-based similarity vector 328, the historical model-based similarity vector 330, and/or the label-based similarity vector 322.

In some embodiments, the scaled feature relevance score 318 is a data entity that describes a scaled measure of a machine learning feature's relevance to the target machine learning model 302. The scaled feature relevance score 318 may include an aggregated feature relevance score that is scaled by one or more scaling parameters. For example, a plurality of similarity scores from the plurality of similarity vectors may be aggregated using one or more scaling parameters to normalize the weights of different similarity analyses. The plurality of similarity scores may be normalized using scaling parameters. The scaling parameters may include a degree on a scale of 0 to 1. In some examples, one or more different scaling parameters may be assigned to each machine learning feature and/or similarity vector. The scaled feature relevance score, $R_f$, may be expressed as:

$$R_f = \omega_1 \times \omega_{1c} \times \text{Domain Similarity} + \omega_2 \times \omega_{2c} \times \text{Problem Similarity} +$$
$$\omega_3 \times \omega_{3c} \times \text{Previous Models Similarity} + \omega_4 \times \omega_{4c} \times \text{Label Association}$$

where $\omega_n$ are tunable weights to allow change for recommendation source importance based on the user preference and $\omega_{nc}$ is a quality score (e.g., a quality metric 320 and/or one or more components thereof) of each which allow to penalize the sources with a lower quality in the ranking list.

In some embodiments, the scaling parameter is to a data entity that describes a relative weight for a machine learning feature and/or a similarity score.

In some embodiments, a scaling parameter includes a tunable similarity importance score that corresponds to a similarity analysis. The tunable similarity important score may be leveraged to scale a similarity score generated in accordance with a particular similarity analysis to adjust the impact of a similarity analysis on the scaled feature relevance score. By way of example, a different tunable similarity important score may correspond to each of the domain-based similarity vector 326, problem-based similarity vector 328, historical model-based similarity vector 330, label-based similarity vector 322, and/or the like to individually adjust similarity scores thereof. In some examples, the tunable similarity importance score may be selected by a user for each similarity analysis.

In some embodiments, a scaling parameter includes one or more quality metrics 320 that correspond to a machine learning feature. The quality metrics 320 may be leveraged to scale the similarity scores of a machine learning feature based on a measure of the feature's quality with respect to a particular model domain. The feature quality, for example, may be based on a feature coverage. As described herein, the feature coverage may be indicative of a percentage of input data objects within a model domain that include a feature value for a respective machine learning feature. For instance, the feature coverage may be indicative of a missingness and/or a representation of a machine learning feature in a dataset of input data objects.

By utilizing scaling parameters and/or one or more of the plurality of similarity vectors of the present disclosure, feature engineering techniques may automatically discover and provide a diverse set of machine learning features that are tailored to multiple different facets of the target machine learning model 302. In this way, some of the feature engineering techniques of the present disclosure improve upon traditional feature discovery methodologies that rely on specific knowledge of the machine learning features of a feature datastore 316. Moreover, in addition to the improved feature discovery capabilities, using some of the techniques of the present disclosure, a plurality of different similarity scores may be generated and then aggregated to produce a relevance measures, aggregated feature relevance score or scaled feature relevance scores 318, that holistically evaluate discovered features. These holistic scores may be practically applied in a model development environment to improve machine learning model development, training, maintenance, and interpretability, among other improvements. An operational example of the combination of similarity scores will now further be described with reference to FIG. 4.

Figure 4:
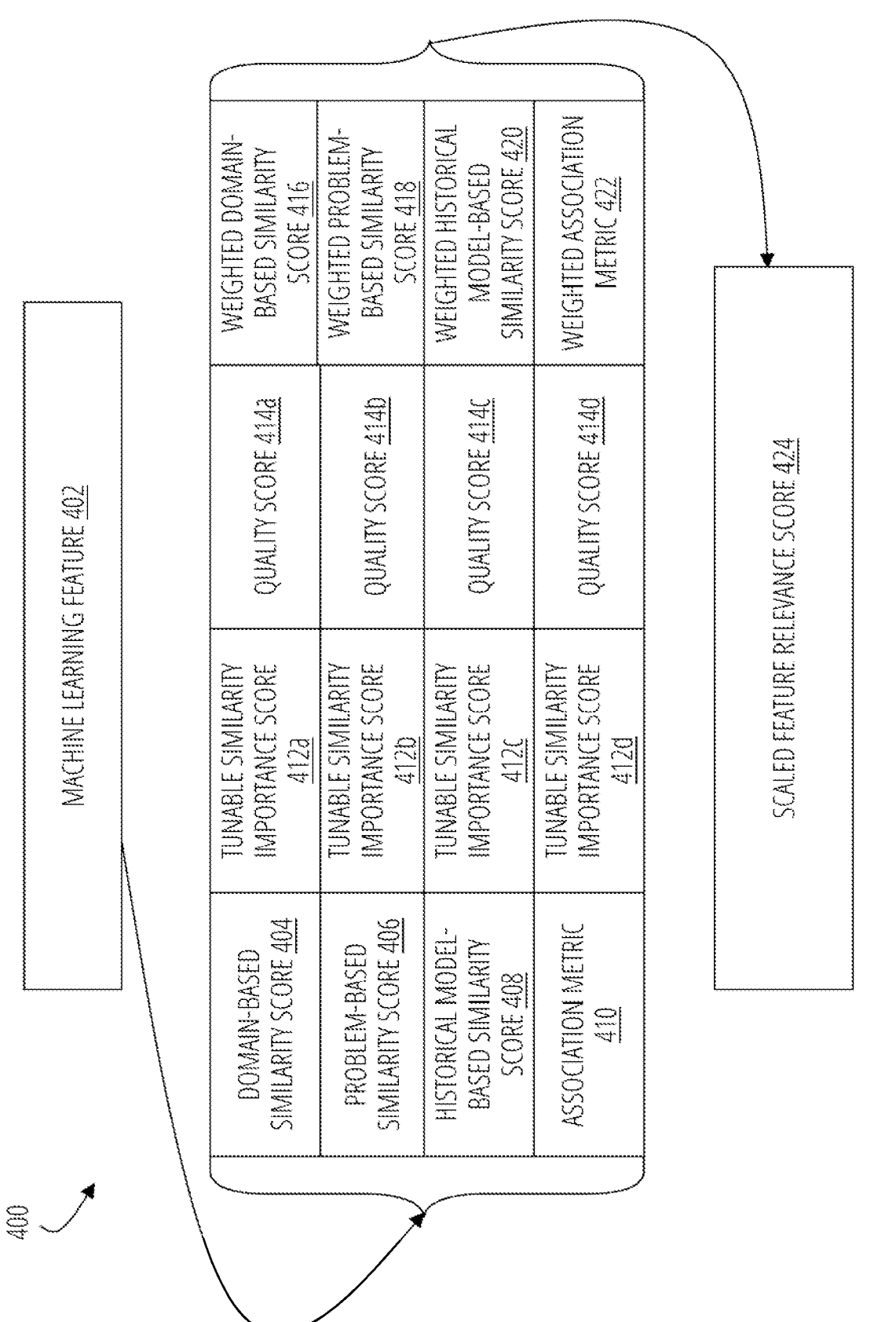
FIG. 4 is an operational example of a plurality of similarity scores for a machine learning feature in accordance with some embodiments discussed herein.

FIG. 4 is an operational example 400 of a plurality of similarity scores for a machine learning feature in accordance with some embodiments discussed herein. The operational example 400 illustrates a scaled feature relevance score 424 for a machine learning feature 402. The scaled feature relevance score 424 is based on a plurality of similarity scores and/or an association metric 410 that respectively correspond to the machine learning feature 402. For example, the domain-based similarity score 404 may include a similarity score that corresponds to the machine learning feature 402 from a domain-based similarity vector. The problem-based similarity score 406 may include a similarity score that corresponds to the machine learning feature 402 from a problem-based similarity vector. The historical model-based similarity score 408 may include a similarity score that corresponds to the machine learning feature 402 from a historical model-based similarity vector. The association metric 410 may include a metric that corresponds to the machine learning feature 402 from a label-based similarity vector.

In some embodiments, one or more of the similarity scores are scaled based on one or more scaling parameters. The scaling parameters, for example, may include a tunable similarity importance score and/or a quality score. In some examples, the scaling parameters may include an individual tunable similarity importance score and/or quality score for individually scaling each of the similarity scores. In some examples, the quality scores may include the quality metrics and/or one or more component scores of the quality metrics.

By way of example, the domain-based similarity score 404 may be associated with a tunable similarity importance score 412*a* and a quality score 414*a*. The tunable similarity importance score 412*a* and the quality score 414*a* may be applied (e.g., multiplied, added, divided, etc.) to the domain-based similarity score 404 to generate a weighted domain-based similarity score 416 for the machine learning feature 402.

In some examples, the problem-based similarity score 406 may be associated with a tunable similarity importance score 412*b* and a quality score 414*b*. The tunable similarity importance score 412*b* and the quality score 414*b* may be applied (e.g., multiplied, added, divided, etc.) to the problem-based similarity score 406 to generate a weighted problem-based similarity score 418 for the machine learning feature 402.

In some examples, the historical model-based similarity score 408 may be associated with a tunable similarity importance score 412*c* and a quality score 414*c*. The tunable similarity importance score 412*c* and the quality score 414*c* may be applied (e.g., multiplied, added, divided, etc.) to the historical model-based similarity score 408 to generate a weighted historical model-based similarity score 420 for the machine learning feature 402.

By way of example, the association metric 410 may be associated with a tunable similarity importance score 412*d* and a quality score 414*d*. The tunable similarity importance score 412*d* and the quality score 414*d* may be applied (e.g., multiplied, added, divided, etc.) to the association metric 410 to generate a weighted association metric 422 for the machine learning feature 402.

In some embodiments, each of the tunable similarity importance scores 412*a-d* include different values. For instance, the tunable similarity importance scores 412*a-d* may be configured by a user, system settings, and/or the like to modify the weight of the scaled feature relevance score 424 to highlight different aspects of the machine learning feature 402. In some examples, the quality scores 414*a-d* may include the same value. For instance, the quality scores 414*a-d* may be indicative of a feature coverage that corresponds to the machine learning feature 402.

In some embodiments, one or more of the similarity scores and/or the association metric 410 are aggregated to generate a scaled feature relevance score 424 for the machine learning feature 402. For instance, the weighted domain-based similarity score 416, the weighted problem-based similarity score 418, the weighted historical model-based similarity score 420, and/or the weighted association metric 422 may be combined (e.g., multiplied, added, etc.) to generate the scaled feature relevance score 424 for the machine learning feature 402.

In this manner, a holistic relevance score may be generated for one or more machine learning features from a feature datastore. The holistic relevance score may be leveraged to identify relevant machine learning features for a target machine learning model. In addition, the holistic scaled feature relevance scores may be used to rank relevant features. In this way, a predictive feature set may be generated that holistically discovers, evaluates, and ranks machine learning features from a feature datastore with respect to one or more facets of a target machine learning model. An operational example of a predictive feature set will now further be described with reference to FIG. 5.

Figure 5:
FIG. 5 is an operational example of a predictive feature set for a target machine learning model in accordance with some embodiments discussed herein.

FIG. 5 is an operational example 500 of a predictive feature set for a target machine learning model in accordance with some embodiments discussed herein. The operational example 500 illustrates an example predictive feature set 324 for a clinical prediction domain. The predictive feature set 324 include a plurality of relevant features 504 and a plurality of scaled feature relevance scores 502 corresponding to the relevant features 504. The relevant features 504, for example with respect to a target machine learning model in a clinical prediction domain, may include a provider panel size, a distance to a member, a provider degree, an x-ray availability, a provider grad school, a chronic condition indicator, a provider tenure, a provider first language, a provider contract type, a provide age, and/or the like. In this example, the provider panel size may be the most relevant feature from the feature datastore, whereas the provider age may be the least relevant feature from the one or more discovered relevant features. By leveraging the scaled feature relevance scores 502 from the predictive feature set 324, a target machine learning model may be trained based on targeted features that are specifically tailored to every aspect of the target machine learning model. The targeted features may include each of the relevant features 504 from the predictive feature set 324 and/or a subset of the relevant features 504 from the predictive feature set 324. By way of example, the relevant features 504 may be screened based on a relevance threshold to improve machine learning performance.

Figure 6:
FIG. 6 is a flowchart showing an example of a process for generating a holistic predictive feature set for a target machine learning model in accordance with some embodiments discussed herein.
Figure 6:
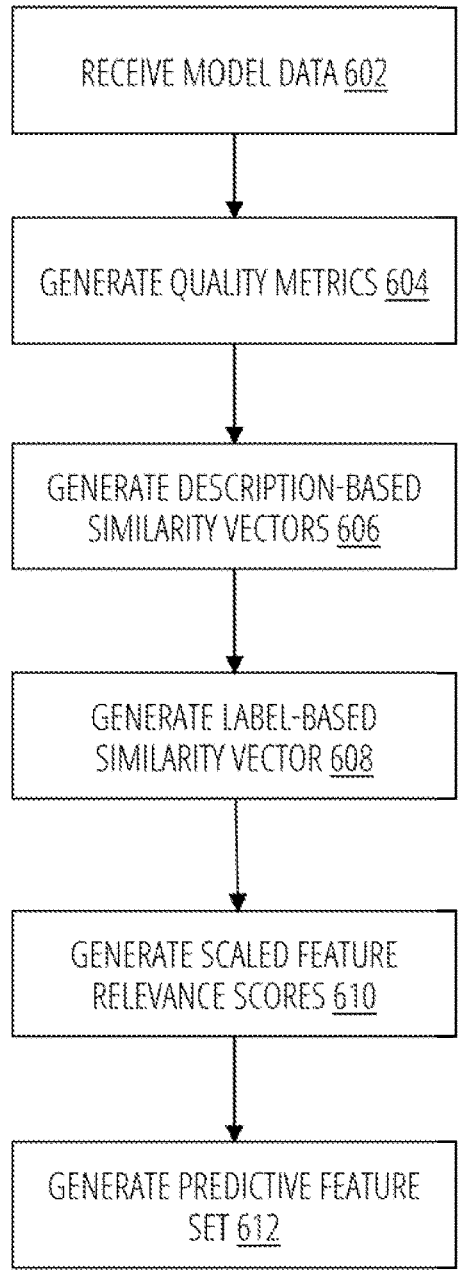

FIG. 6 is a flowchart showing an example of a process 600 for generating a holistic predictive feature set for a target machine learning model in accordance with some embodiments discussed herein. The flowchart depicts a feature engineering technique that overcomes various limitations, such as limited, inaccurate, and/or incomprehensive feature discovery and evaluation, which are associated with traditional feature engineering techniques. The feature engineering technique may be implemented by one or more computing devices, entities, and/or systems described herein. For example, via the various steps/operations of the process 600, the computing system 100 may leverage model and feature data to automatically generate a predictive feature set for a target machine learning model to overcome the various limitations with conventional feature engineering techniques that underutilize and/or otherwise inefficiently use robust feature datastores.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/ operation 602, receiving model data. For example, the computing system 100 may receive the model data. For example, the computing system 100 may provide a developmental user interface that is indicative of one or more model requirements for a target machine learning model. In some examples, the model data may include one or more model attributes. The one or more model attributes may be provided through the developmental user interface. In some examples, the model attributes may include a textual model description for the target machine learning model. In addition, or alternatively, the model attributes may include user preferences, training data, and/or any other desired characteristic for a target machine learning model.

In some embodiments, the model data includes one or more user preferences and/or data filters. The user preferences may include a source accessibility and/or quality preference. For instance, a user may choose (e.g., through the developmental user interface, etc.) to only investigate features from a feature datastore from data sources that the user has access to (e.g., through one or more user privileges, etc.), or only publicly available data sources, and/or data sources for which the user may have an appropriate role meaning that access is feasible if not immediate. In some examples, the source accessibility and/or quality preference may include an acceptable range of a feature's data source quality. In some examples, the user preferences may include a feature domain preference. For instance, the user may choose (e.g., through the developmental user interface, etc.) to focus on features which are based on a specific prediction domain, such as a clinical information domain, socio-demographic information, a financial domain, and/o the like. This may be relevant for business users who are interested in identifying opportunities within a particular domain. In some examples, applying these initial filters may offer the user more control over the recommendations, meaning significant, useable features would not be lost in the noise of features which users are unlikely to be able to incorporate into their target machine learning model. It would also limit the scope of the recommendation engine, leading to a more efficient process.

In some embodiments, the process 600 includes, at step/ operation 604, generating quality metrics. For example, the computing system 100 may generate the quality metrics for one or more machine learning features from the feature datastore. For instance, the features may be evaluated based on their quality to generate the quality metrics. The quality metrics may be based on the feature's data source. By way of example, different features from the feature datastore may be maintained by a different data source. Each data source may have different characteristics in terms of data quality.

In some embodiments, the computing system 100 may generate one or more quality scores for a machine learning feature based on these characteristics. The quality scores for a respective machine learning feature, for example, may include a refresh rate in which a user may limit the data to the sources that have a specific refresh frequency. For example, a real time model may require data that have a refresh frequency in a certain time frame (e.g., seconds, minutes, etc.), while batch mode models may have no issue with features that have other time frames (e.g., weekly update frequency, etc.). In addition, or alternatively, a quality score may be indicative of a feature coverage (e.g., 0% to 100% of input data objects in training data and/or one or more data sources, etc.). In some examples, a quality score may include a data source response time (e.g., 0 to 1). Based on a comparison to other data sources' response times. The fastest source may have a score of 0 while the lowest may have a score of 1.

In some embodiments, the computing system 100 generates a quality metric for each machine learning feature based on an average score across the one or more quality scores.

In some embodiments, the process 600 includes, at step/ operation 606, generating description-based similarity vectors. For example, the computing system 100 may generate the one or more description-based similarity vectors. For instance, the computing system 100 may generate the one or more description-based similarity vectors based on a model description vector for the target machine learning model. A description-based similarity vector of the one or more description-based similarity vectors may include one or more of a plurality of similarity scores for a plurality of machine learning features. In some examples, the plurality of similarity scores may be based on the model description vector.

In some embodiments, the process 600 includes, at step/ operation 608, generating a label-based similarity vector. For example, the computing system 100 may generate the label-based similarity vector based on a comparison between training data for the target machine learning model and a plurality of feature values of the plurality of machine learning features.

In some embodiments, the process 600 includes, at step/ operation 610, generating a plurality of scaled feature relevance scores. For example, the computing system 100 may generate the plurality of scaled feature relevance scores based on the one or more description-based similarity vectors and/or the label-based similarity vector. For instance, the one or more description-based similarity vectors may include a domain-based similarity vector, a problem-based similarity vector, and/or a historical model-based similarity vector. The computing system 100 may generate a plurality of aggregated feature relevance scores for a subset of machine learning features from the plurality of machine learning features based on an aggregation of the domain-based similarity vector, the problem-based similarity vector, the historical model-based similarity vector, and/or the label-based similarity vector.

In some embodiments, the domain-based similarity vector, the problem-based similarity vector, the historical model-based similarity vector, and/or the label-based similarity vector are associated with one or more different machine learning features from the plurality of machine learning features. The subset of machine learning features from the plurality of machine learning features may include one or more machine learning features from each of the domain-based similarity vector, the problem-based similarity vector, the historical model-based similarity vector, and/ or the label-based similarity vector.

In some embodiments, the computing system 100 may generate the plurality of scaled feature relevance scores by applying one or more scaling parameters to the plurality of aggregated feature relevance scores. In some examples, the computing system 100 may individually apply the scaling parameters to each individual similarity score for a machine learning feature. For instance, the one or more scaling parameters may include one or more user defined parameters indicative of a user preference for each of the domain-based similarity vector, the problem-based similarity vector, the historical model-based similarity vector, and/or the label-based similarity vector.

In some embodiments, the process 600 includes, at step/operation 612, generating a predictive feature set. For example, the computing system 100 may generate the predictive feature set based on the plurality of aggregated feature relevance scores. For instance, the computing system 100 may generate the predictive feature set based on the plurality of scaled feature relevance scores. In some examples, the computing system 100 may provide the predictive feature set for the target machine learning model based on the one or more similarity vectors and the one or more label-based similarity vectors. For example, the computing system 100 may provide the predictive feature set for display through a developmental user interface.

Some techniques of the present disclosure enable the generation of action outputs that may be performed to initiate one or more predictive actions to achieve real-world effects. The feature engineering techniques of the present disclosure may be used, applied, and/or otherwise leveraged to generate similarity score, relevant features, feature relevance scores, scaled feature relevant scores, predictive feature sets, and/or the like. These outputs may be leveraged to initiate the performance of various computing tasks that improve the performance of a computing system (e.g., a computer itself, etc.) with respect to various predictive actions performed by the computing system 100.

In some examples, the computing tasks may include predictive actions that may be based on a prediction domain. A prediction domain may include any environment in which computing systems may be applied to achieve real-word insights, such as predictions, and initiate the performance of computing tasks, such as predictive actions, to act on the real-world insights. These predictive actions may cause real-world changes, for example, by controlling a hardware component, providing targeted features for machine learning model training and development, data quality alerts, automatically allocating computing or human resources, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated machine learning model development actions, automated computing resource allocation actions, automated adjustments to computing and/or human resource management, and/or the like.

As one example, a prediction domain may include a clinical prediction domain. In such a case, the predictive actions may include automated machine learning model notification actions, such as physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource allocation actions, automated call center preparation actions, automated hospital preparation actions, automated pricing actions, automated plan update actions, automated alert generation actions, and/or the like.

In some embodiments, the feature engineering techniques of process 600 are applied to initiate the performance of one or more predictive actions. A predictive action may depend on the prediction domain. In some examples, the computing system 100 may leverage the feature engineering techniques to generate a predictive feature set that may be leveraged to initiate model development operations, such as diagnostic tests, and/or the like, for generating, training and interpreting a target machine learning model. These predictive insights may be leveraged to refine a machine learning model to improve model performance over time. Moreover, the predictive feature set may be displayed as a visual rendering of the aforementioned examples to illustrate relevant features, relevance scores for the relevant feature, and/or the like, for improving machine learning development given constraints of a particular organization and/or feature datastore.

Figure 7:
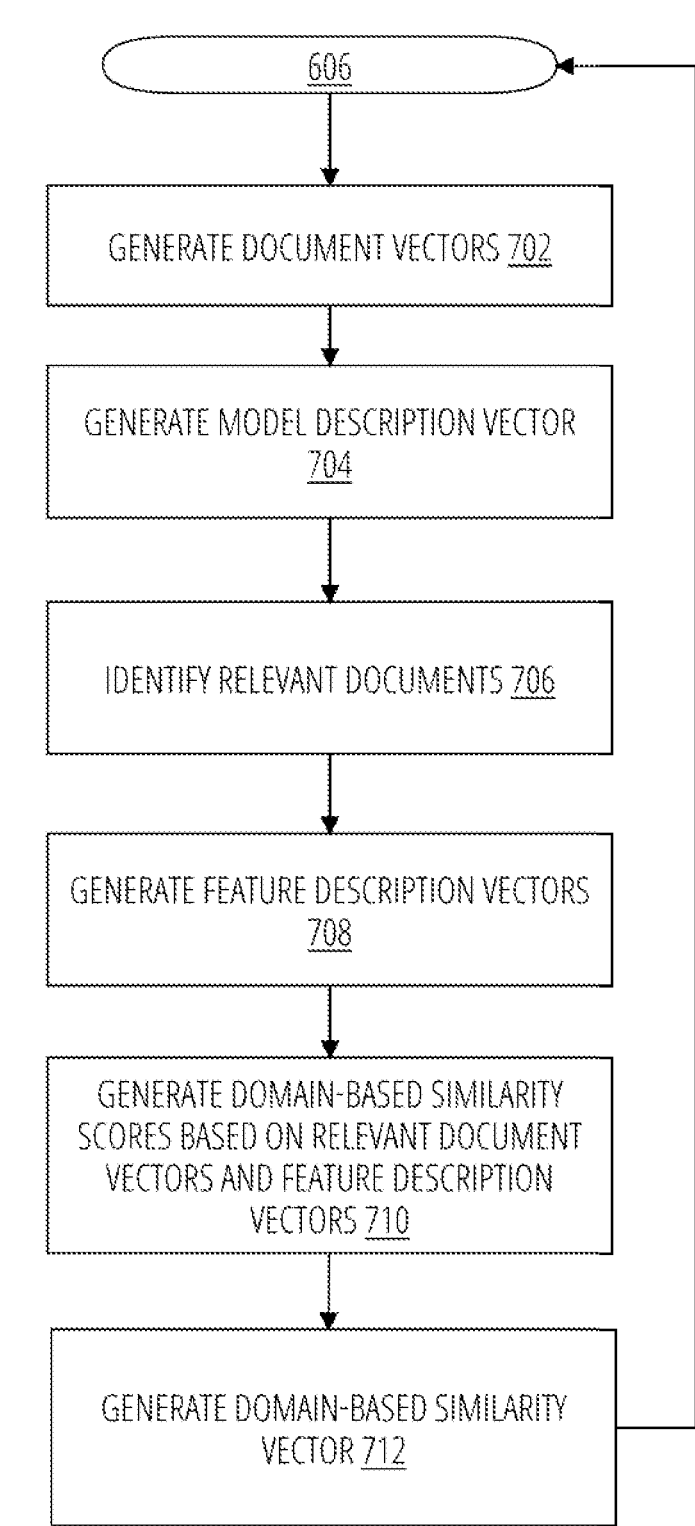
FIG. 7 is a flowchart showing an example of a process for generating a domain-based similarity vector in accordance with some embodiments discussed herein.

FIG. 7 is a flowchart showing an example of a process for generating a domain-based similarity vector in accordance with some embodiments discussed herein. The flowchart depicts one example similarity measurement technique for measuring the similarity between a machine learning feature and a target machine learning model. By doing so, the similarity measurement technique may be implemented to overcome various limitations, such as the requirement for specific feature knowledge of a robust feature datastore, that are associated with traditional feature discovery techniques. The similarity measurement techniques may be implemented by one or more computing devices, entities, and/or systems described herein. For example, via the various steps/operations of the process 700, the computing system 100 may overcome the various limitations with conventional feature discovery techniques that underutilize and/or otherwise inefficiently use robust feature datastores.

FIG. 7 illustrates an example process 700 for explanatory purposes. Although the example process 700 depicts a particular sequence of steps/operations, the sequence may be altered without departing from the scope of the present disclosure. For example, some of the steps/operations may be performed in parallel or in a different sequence that does not materially impact the function of the process 700. In other examples, different components of an example device or system that implements the process 700 may perform functions at substantially the same time or in a specific sequence.

In some embodiments, the process 700 includes a plurality of steps/operations subsequent to the step/operation 606 of process 600, where the process 600 includes generating a description-based similarity vector for a target machine learning model. In some examples, the process 700 may include one or more suboperations of step/operation 606.

In some embodiments, the process 700 includes, at step/operation 702, generating one or more document vectors. For example, the computing system 100 may generate the one or more document vectors. For example, the model description vector may be generated using a language processing model.

In some embodiments, the process 700 includes, at step/operation 704, generating a model description vector. For example, the computing system 100 may generate the model description vector from a textual model description for a target machine learning model, as described herein.

In some embodiments, the process 700 includes, at step/operation 706, identifying one or more relevant documents. For example, the computing system 100 may identify one or more relevant natural language documents from a plurality of natural language documents based on a plurality of document similarity scores. The plurality of document similarity scores may be based on a comparison between the model description vector and a plurality of document vectors corresponding to the plurality of natural language documents for the model domain.

In some embodiments, the process 700 includes, at step/operation 708, generating one or more feature description vectors. For example, the computing system 100 may generate the one or more feature description vectors, as described herein.

In some embodiments, the process 700 includes, at step/operation 710, generating a plurality of domain-based similarity scores based on the relevant document vectors and/or the feature description vectors. For example, the computing system 100 may generate the plurality of domain-based similarity scores based on the relevant document vectors and/or the feature description vector. In some examples, the computing system 100 may generate, using a vector similarity model, the plurality of domain-based similarity scores based on a comparison between (i) one or more document vectors of the plurality of document vectors that correspond to the one or more relevant natural language documents and (ii) the plurality of feature description vectors corresponding to the plurality of textual feature descriptions for the plurality of machine learning features, as described herein.

In some embodiments, the process 700 includes, at step/operation 712, generating a domain-based similarity vector. For example, the computing system 100 may generate the domain-based similarity vector. A description-based similarity vector, for example, may include the domain-based similarity vector. The computing system 100 may generate the domain-based similarity vector based on the plurality of domain-based similarity scores. For instance, the domain-based similarity vector may include one or more domain-based similarity scores of the plurality of domain-based similarity scores that satisfy a relative similarity threshold.

Figure 8:
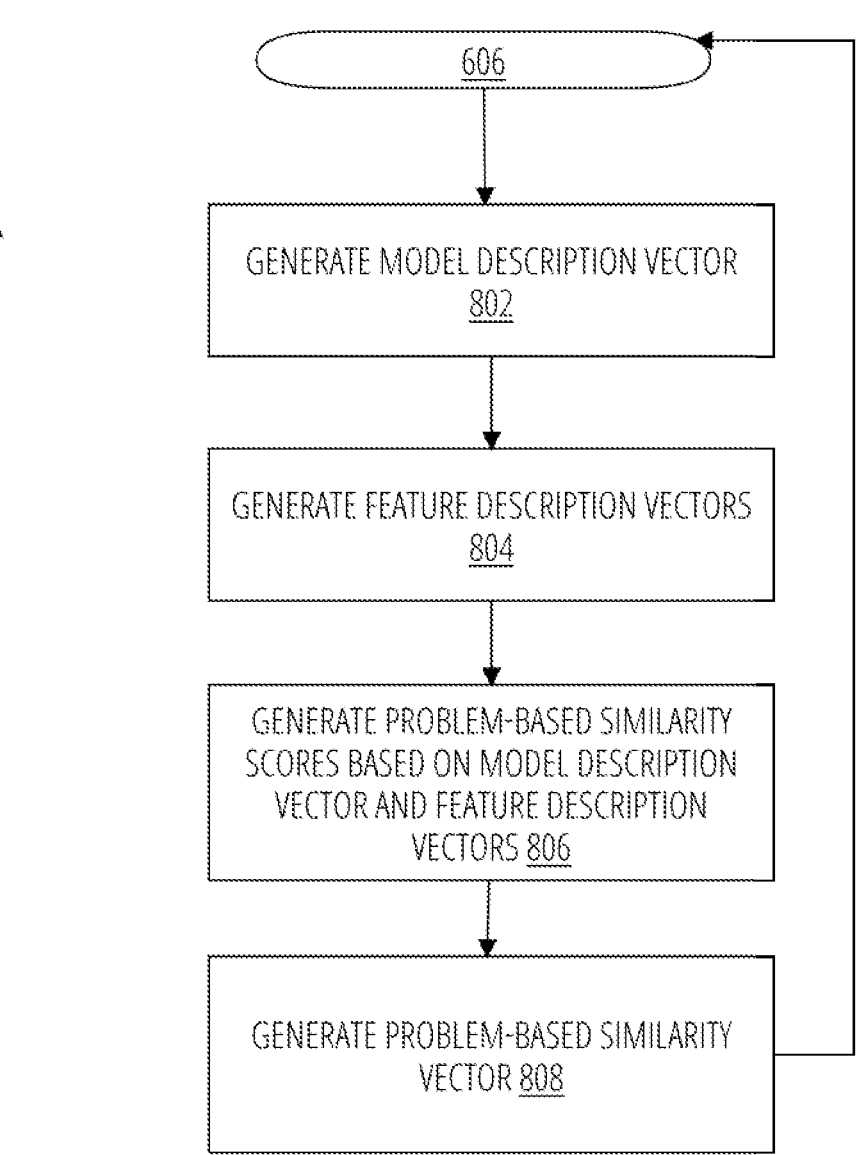
FIG. 8 is a flowchart showing an example of a process for generating a problem-based similarity vector in accordance with some embodiments discussed herein.

FIG. 8 is a flowchart showing an example of a process 800 for generating a problem-based similarity vector in accordance with some embodiments discussed herein. The flowchart depicts one example similarity measurement technique for measuring the similarity between a machine learning feature and a target machine learning model. By doing so, the similarity measurement technique may be implemented to overcome various limitations, such as the requirement for specific feature knowledge of a robust feature datastore, that are associated with traditional feature discovery techniques. The similarity measurement techniques may be implemented by one or more computing devices, entities, and/or systems described herein. For example, via the various steps/operations of the process 800, the computing system 100 may overcome the various limitations with conventional feature discovery techniques that underutilize and/or otherwise inefficiently use robust feature datastores.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes a plurality of steps/operations subsequent to the step/operation 606 of process 600, where the process 600 includes generating a description-based similarity vector for a target machine learning model. In some examples, the process 800 may include one or more suboperations of step/operation 606.

In some embodiments, the process 800 includes, at step/operation 802, generating a model description vector. For example, the computing system 100 may generate the model description vector from a textual model description for a target machine learning model, as described herein.

In some embodiments, the process 800 includes, at step/operation 804, generating one or more feature description vectors. For example, the computing system 100 may generate the one or more feature description vectors, as described herein. For example, the computing system 100 may generate, using a language processing model, the plurality of feature description vectors based on the plurality of textual feature descriptions for the plurality of machine learning features.

In some embodiments, the process 800 includes, at step/operation 806, generating a plurality of problem-based similarity scores. For example, the computing system 100 may generate, using a vector similarity model, the plurality of problem-based similarity scores based on a comparison between the model description vector and the plurality of feature description vectors.

In some embodiments, the process 800 includes, at step/operation 808, generating a problem-based similarity vector. For example, the computing system 100 may generate the problem-based similarity vector, as described herein. A description-based similarity vector, for example, may include the problem-based similarity vector. For instance, the plurality of similarity scores may be based on a comparison between the model description vector and a plurality of feature description vectors corresponding to a plurality of textual feature descriptions for the plurality of machine learning features.

In some embodiments, the computing system 100 generates the problem-based similarity vector based on the plurality of problem-based similarity scores. In some examples, problem-based similarity vector may include one or more similarity scores of the plurality of problem-based similarity scores that satisfy a relative similarity threshold.

Figure 9:
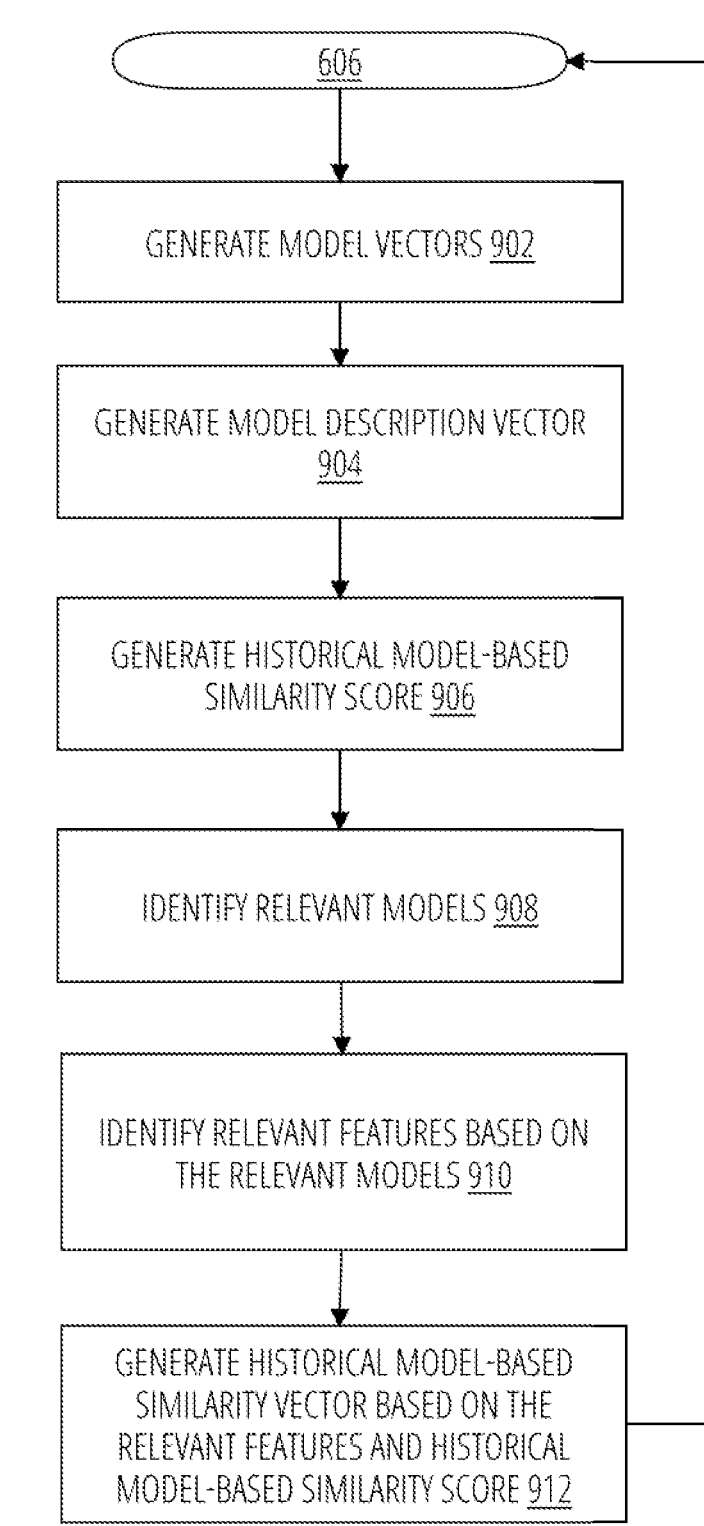
FIG. 9 is a flowchart showing an example of a process for generating a historical model-based similarity vector in accordance with some embodiments discussed herein.

FIG. 9 is a flowchart showing an example of a process 900 for generating a historical model-based similarity vector in accordance with some embodiments discussed herein. The flowchart depicts one example similarity measurement technique for measuring the similarity between a machine learning feature and a target machine learning model. By doing so, the similarity measurement technique may be implemented to overcome various limitations, such as the requirement for specific feature knowledge of a robust feature datastore, that are associated with traditional feature discovery techniques. The similarity measurement techniques may be implemented by one or more computing devices, entities, and/or systems described herein. For example, via the various steps/operations of the process 900, the computing system 100 may overcome the various limitations with conventional feature discovery techniques that underutilize and/or otherwise inefficiently use robust feature datastores.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some embodiments, the process 900 includes a plurality of steps/operations subsequent to the step/operation 606 of process 600, where the process 600 includes generating a description-based similarity vector for a target machine learning model. In some examples, the process 900 may include one or more suboperations of step/operation 606.

In some embodiments, the process 900 includes, at step/ operation 902, generating a plurality of model vectors. For example, the computing system 100 may generate the plurality of model vectors. For instance, the computing system 100 may generate the plurality of model vectors based on model metadata corresponding to a plurality of historical machine learning models, as described herein.

In some embodiments, the process 900 includes, at step/ operation 904, generating a model description vector. For example, the computing system 100 may generate the model description vector from a textual model description for a target machine learning model, as described herein.

In some embodiments, the process 900 includes, at step/ operation 906, generating a plurality of historical model-based similarity scores. For example, the computing system 100 may generate the plurality of historical model-based similarity scores. The plurality of model similarity scores may be based on a comparison between the model description vector and the plurality of model vectors corresponding to a plurality of historical model descriptions for the plurality of historical machine learning models.

In some embodiments, the process 900 includes, at step/ operation 908, identifying one or more relevant models. For example, the computing system 100 may identify the one or more relevant models. For instance, the computing system 100 may identify the one or more relevant models from the plurality of historical machine learning models based on the plurality of model similarity scores.

In some embodiments, the process 900 includes, at step/ operation 910, identifying one or more relevant features based on the one or more relevant models. For example, the computing system 100 may identify the one or more relevant features based on the one or more relevant models, as described herein.

In some embodiments, the process 900 includes, at step/ operation 910, generating a historical model-based similarity vector based on the relevant features and the historical model-based similarity scores. For example, the computing system 100 may generate the historical model-based similarity vector based on the relevant features and the historical model-based similarity scores. For instance, the description-based similarity vector may include a historical model-based similarity vector. The computing system may generate the historical model-based similarity vector based on the one or more relevant models and/or the plurality of model similarity scores.

Figure 10:
FIG. 10 is a flowchart showing an example of a process for generating a label-based similarity vector in accordance with some embodiments discussed herein.
Figure 10:
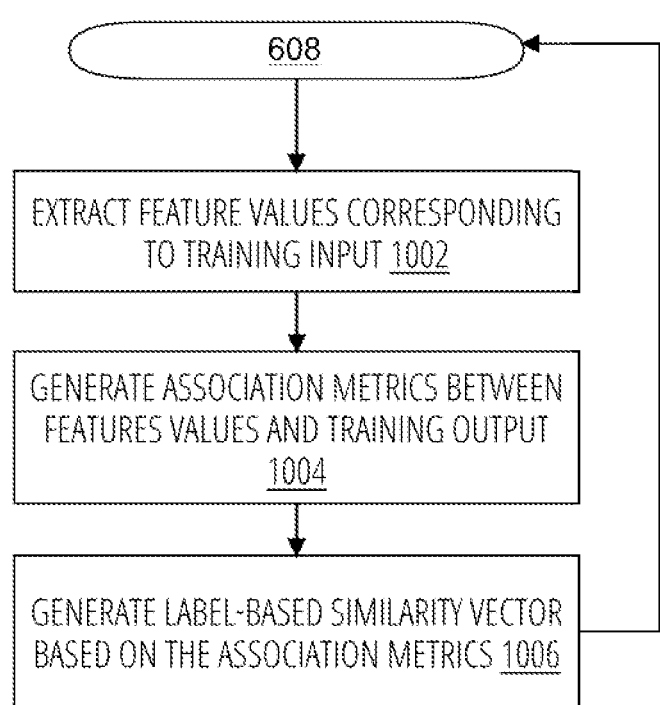

FIG. 10 is a flowchart showing an example of a process 1000 for generating a label-based similarity vector in accordance with some embodiments discussed herein. The flowchart depicts one example similarity measurement technique for measuring the similarity between a machine learning feature and a target machine learning model. By doing so, the similarity measurement technique may be implemented to overcome various limitations, such as the requirement for specific feature knowledge of a robust feature datastore, that are associated with traditional feature discovery techniques. The similarity measurement techniques may be implemented by one or more computing devices, entities, and/or systems described herein. For example, via the various steps/operations of the process 1000, the computing system 100 may overcome the various limitations with conventional feature discovery techniques that underutilize and/or otherwise inefficiently use robust feature datastores.

FIG. 10 illustrates an example process 1000 for explanatory purposes. Although the example process 1000 depicts a particular sequence of steps/operations, the sequence may be altered without departing from the scope of the present disclosure. For example, some of the steps/operations depicted may be performed in parallel or in a different sequence that does not materially impact the function of the process 1000. In other examples, different components of an example device or system that implements the process 1000 may perform functions at substantially the same time or in a specific sequence.

In some embodiments, the process 1000 includes a plurality of steps/operations subsequent to the step/operation 608 of process 600, where the process 600 includes generating a label-based similarity vector for a target machine learning model based on training data for the target machine learning model. In some examples, the process 1000 may include one or more suboperations of step/operation 608.

In some embodiments, the process 1000 includes, at step/operation 1002, extracting feature values corresponding to one or more training inputs. For example, the computing system 100 may extract the feature values corresponding to the one or more training inputs, as described herein. For instance, the training data may include one or more training inputs and/or one or more training outputs for the target machine learning model. The computing system may identify a plurality of feature values based on the one or more training inputs.

In some embodiments, the process 1000 includes, at step/operation 1004, generating a plurality of association metrics between the feature values and a training output. For example, the computing system 100 may generate a plurality of feature association metrics between the feature values and the training output, as described herein. For instance, the computing system may generate the plurality of feature association metrics for the plurality of machine learning features based on a comparison between the plurality of feature values and the one or more training outputs.

In some embodiments, the process 1000 includes, at step/operation 1006, generating a label-based similarity vector based on the association metrics. For example, the computing system 100 may generate the label-based similarity vector based on the association metrics, as described herein. For instance, the computing system may generate the label-based similarity vector based on the plurality of feature association metrics. In some examples, the label-based similarity vector may include one or more of the feature association metrics that satisfy a relative similarity threshold.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method, the computer-implemented method comprising generating, by one or more processors, model description vector from a textual model description for a target machine learning model; generating, by the one or more processors, one or more description-based similarity vectors based on the model description vector, wherein (i) a description-based similarity vector of the one or more description-based similarity vectors comprises one or more of a plurality of similarity scores for a plurality of machine learning features, and (ii) the plurality of similarity scores is based on the model description vector; generating, by the one or more processors, a label-based similarity vector based on a comparison between training data for the target machine learning model and a plurality of feature values of the plurality of machine learning features; and providing, by the one or more processors, a predictive feature set for the target machine learning model based on the one or more description-based similarity vectors and the label-based similarity vector.

Example 2. The computer-implemented method of example 1, wherein the description-based similarity vector comprises a problem-based similarity vector and the plurality of similarity scores is based on a comparison between the model description vector and a plurality of feature description vectors corresponding to a plurality of textual feature descriptions for the plurality of machine learning features.

Example 3. The computer-implemented method of example 2 further comprising generating, using a language processing model, the plurality of feature description vectors based on the plurality of textual feature descriptions for the plurality of machine learning features; generating, using a vector similarity model, a plurality of problem-based similarity scores based on a comparison between the model description vector and the plurality of feature description vectors; and generating the problem-based similarity vector based on the plurality of problem-based similarity scores, wherein the problem-based similarity vector comprises one or more similarity scores of the plurality of problem-based similarity scores that satisfy a relative similarity threshold.

Example 4. The computer-implemented method of example 3, wherein the model description vector is generated using the language processing model.

Example 5. The computer-implemented method of any of the preceding examples, wherein the description-based similarity vector comprises a domain-based similarity vector, and generating the one or more description-based similarity vectors comprises identifying one or more relevant natural language documents based on a plurality of document similarity scores, wherein the plurality of document similarity scores is based on a comparison between the model description vector and a plurality of document vectors corresponding to a plurality of natural language documents for a model domain; generating, using a vector similarity model, a plurality of domain-based similarity scores based on a comparison between (i) one or more document vectors of the plurality of document vectors that correspond to the one or more relevant natural language documents and (ii) a plurality of feature description vectors corresponding to a plurality of textual feature descriptions for the plurality of machine learning features; and generating the domain-based similarity vector based on the plurality of domain-based similarity scores, wherein the domain-based similarity vector comprises one or more domain-based similarity scores of the plurality of domain-based similarity scores that satisfy a relative similarity threshold.

Example 6. The computer-implemented method of any of the preceding examples, wherein the description-based similarity vector comprises a historical model-based similarity vector, and the one or more description-based similarity vectors comprises identifying one or more relevant models based on a plurality of model similarity scores, wherein the plurality of model similarity scores is based on a comparison between the model description vector and a plurality of model vectors corresponding to a plurality of historical model descriptions for a plurality of historical machine learning models; and generating the historical model-based similarity vector based on the one or more relevant models and the plurality of model similarity scores.

Example 7. The computer-implemented method of any of the preceding examples, wherein the training data comprise one or more training inputs and one or more training outputs, and wherein generating the label-based similarity vector comprises identifying the plurality of feature values based on the one or more training inputs; generating a plurality of feature association metrics for the plurality of machine learning features based on a comparison between the plurality of feature values and the one or more training outputs; and generating the label-based similarity vector based on the plurality of feature association metrics, wherein the label-based similarity vector comprises one or more of the plurality of feature association metrics that satisfy a relative similarity threshold.

Example 8. The computer-implemented method of any of the preceding examples, wherein the one or more description-based similarity vectors comprise a domain-based similarity vector, a problem-based similarity vector, and a historical model-based similarity vector, and wherein the computer-implemented method further comprises generating a plurality of aggregated feature relevance scores for a subset of machine learning features from the plurality of machine learning features based on an aggregation of the domain-based similarity vector, the problem-based similarity vector, the historical model-based similarity vector, and the label-based similarity vector; and generating the predictive feature set based on the plurality of aggregated feature relevance scores.

Example 9. The computer-implemented method of example 8, wherein the domain-based similarity vector, the problem-based similarity vector, the historical model-based similarity vector, and the label-based similarity vector are associated with one or more different machine learning features from the plurality of machine learning features.

Example 10. The computer-implemented method of example 9, wherein the subset of machine learning features from the plurality of machine learning features comprise one or more machine learning features from each of the domain-based similarity vector, the problem-based similarity vector, the historical model-based similarity vector, and the label-based similarity vector.

Example 11. The computer-implemented method of examples 9 or 10 further comprising generating a plurality of scaled feature relevance scores by applying one or more scaling parameters to the plurality of aggregated feature relevance scores, wherein the one or more scaling parameters include one or more user defined parameters indicative of a user preference for each of the domain-based similarity vector, the problem-based similarity vector, the historical model-based similarity vector, and the label-based similarity vector; and generating the predictive feature set based on the plurality of scaled feature relevance scores.

Example 12. A computing system comprising memory and one or more processors communicatively coupled to the memory, the one or more processors configured to generate a model description vector from a textual model description for a target machine learning model; generate one or more description-based similarity vectors based on the model description vector, wherein (i) a description-based similarity vector of the one or more description-based similarity vectors comprises one or more of a plurality of similarity scores for a plurality of machine learning features, and (ii) the plurality of similarity scores is based on the model description vector; generate a label-based similarity vector based on a comparison between training data for the target machine learning model and a plurality of feature values of the plurality of machine learning features; and provide a predictive feature set for the target machine learning model based on the one or more description-based similarity vectors and the label-based similarity vector.

Example 13. The computing system of example 12, wherein the description-based similarity vector comprises a problem-based similarity vector and the plurality of similarity scores is based on a comparison between the model description vector and a plurality of feature description vectors corresponding to a plurality of textual feature descriptions for the plurality of machine learning features.

Example 14. The computing system of example 13, wherein the one or more processors are further configured to generate, using a language processing model, the plurality of feature description vectors based on the plurality of textual feature descriptions for the plurality of machine learning features; generate, using a vector similarity model, a plurality of problem-based similarity scores based on a comparison between the model description vector and the plurality of feature description vectors; and generate the problem-based similarity vector based on the plurality of problem-based similarity scores, wherein the problem-based similarity vector comprises one or more similarity scores of the plurality of problem-based similarity scores that satisfy a relative similarity threshold.

Example 15. The computing system of any of examples 12 through 14, wherein the description-based similarity vector comprises a domain-based similarity vector, and generating the one or more description-based similarity vectors comprises identifying one or more relevant natural language documents based on a plurality of document similarity scores, wherein the plurality of document similarity scores is based on a comparison between the model description vector and a plurality of document vectors corresponding to a plurality of natural language documents for a model domain; generating, using a vector similarity model, a plurality of domain-based similarity scores based on a comparison between (i) one or more document vectors of the plurality of document vectors that correspond to the one or more relevant natural language documents and (ii) a plurality of feature description vectors corresponding to a plurality of textual feature descriptions for the plurality of machine learning features; and generating the domain-based similarity vector based on the plurality of domain-based similarity scores, wherein the domain-based similarity vector comprises one or more domain-based similarity scores of the plurality of domain-based similarity scores that satisfy a relative similarity threshold.

Example 16. The computing system of any of examples 12 through 15, wherein the description-based similarity vector comprises a historical model-based similarity vector, and the one or more description-based similarity vectors comprises identifying one or more relevant models based on a plurality of model similarity scores, wherein the plurality of model similarity scores is based on a comparison between the model description vector and a plurality of model vectors corresponding to a plurality of historical model descriptions for a plurality of historical machine learning models; and generating the historical model-based similarity vector based on the one or more relevant models and the plurality of model similarity scores.

Example 17. One or more non-transitory computer-readable storage media including instructions that, when executed by one or more processors, cause the one or more processors to generate a model description vector from a textual model description for a target machine learning model; generate one or more description-based similarity vectors based on the model description vector, wherein (i) a description-based similarity vector of the one or more description-based similarity vectors comprises one or more of a plurality of similarity scores for a plurality of machine learning features, and (ii) the plurality of similarity scores is based on the model description vector; generate a label-based similarity vector based on a comparison between training data for the target machine learning model and a plurality of feature values of the plurality of machine learning features; and provide a predictive feature set for the target machine learning model based on the one or more description-based similarity vectors and the label-based similarity vector.

Example 18. The one or more non-transitory computer-readable storage media of example 17, wherein the training data comprise one or more training inputs and one or more training outputs, and wherein generating the label-based similarity vector comprises identifying the plurality of feature values based on the one or more training inputs; generating a plurality of feature association metrics for the plurality of machine learning features based on a comparison between the plurality of feature values and the one or more training outputs; and generating the label-based similarity vector based on the plurality of feature association metrics, wherein the label-based similarity vector comprises one or more of the plurality of feature association metrics that satisfy a relative similarity threshold.

Example 19. The one or more non-transitory computer-readable storage media of examples 17 or 18, wherein the one or more description-based similarity vectors comprise a domain-based similarity vector, a problem-based similarity vector, and a historical model-based similarity vector, and wherein the instructions further cause the one or more processors to generate a plurality of aggregated feature relevance scores for a subset of machine learning features from the plurality of machine learning features based on an aggregation of the domain-based similarity vector, the problem-based similarity vector, the historical model-based similarity vector, and the label-based similarity vector; and generate the predictive feature set based on the plurality of aggregated feature relevance scores.

Example 20. The one or more non-transitory computer-readable storage media of example 19, wherein the domain-based similarity vector, the problem-based similarity vector, the historical model-based similarity vector, and the label-based similarity vector are associated with one or more different machine learning features from the plurality of machine learning features.

The invention claimed is:

1. A computer-implemented method comprising:

generating, by one or more processors, a model description vector from a textual model description for a target machine learning model;

generating, by the one or more processors, a plurality of description-based similarity vectors based on the model description vector, wherein:

(i) a description-based similarity vector of the plurality of description-based similarity vectors comprises one or more of a plurality of similarity scores for a plurality of machine learning features, and (ii) the plurality of similarity scores is based on the model description vector;

generating, by the one or more processors, a label-based similarity vector based on a comparison between training data for the target machine learning model and a plurality of feature values of the plurality of machine learning features;

generating, by the one or more processors and based on the plurality of description-based similarity vectors and the label-based similarity vector, a predictive feature set comprising a pre-defined number of features that provide improved model performance when training the target machine learning model; and training, by the one or more processors, the target machine learning model using the predictive feature set.

2. The computer-implemented method of claim 1, wherein the description-based similarity vector comprises a problem-based similarity vector and the plurality of similarity scores is based on a comparison between the model description vector and a plurality of feature description vectors corresponding to a plurality of textual feature descriptions for the plurality of machine learning features.

3. The computer-implemented method of claim 2 further comprising:

generating, using a language processing model, the plurality of feature description vectors based on the plurality of textual feature descriptions for the plurality of machine learning features;

generating, using a vector similarity model, a plurality of problem-based similarity scores based on a comparison between the model description vector and the plurality of feature description vectors; and generating the problem-based similarity vector based on the plurality of problem-based similarity scores, wherein the problem-based similarity vector comprises one or more similarity scores of the plurality of problem-based similarity scores that satisfy a relative similarity threshold.

4. The computer-implemented method of claim 3, wherein the model description vector is generated using the language processing model.

5. The computer-implemented method of claim 1, wherein the description-based similarity vector comprises a domain-based similarity vector, and generating the plurality of description-based similarity vectors comprises:

identifying one or more relevant natural language documents based on a plurality of document similarity scores, wherein the plurality of document similarity scores is based on a comparison between the model description vector and a plurality of document vectors corresponding to a plurality of natural language documents for a model domain;

generating, using a vector similarity model, a plurality of domain-based similarity scores based on a comparison between (i) one or more document vectors of the plurality of document vectors that correspond to the one or more relevant natural language documents and (ii) a plurality of feature description vectors corresponding to a plurality of textual feature descriptions for the plurality of machine learning features; and generating the domain-based similarity vector based on the plurality of domain-based similarity scores, wherein the domain-based similarity vector comprises one or more domain-based similarity scores of the plurality of domain-based similarity scores that satisfy a relative similarity threshold.

6. The computer-implemented method of claim 1, wherein the description-based similarity vector comprises a historical model-based similarity vector, and the plurality of description-based similarity vectors comprises:

identifying one or more relevant models based on a plurality of model similarity scores, wherein the plurality of model similarity scores is based on a comparison between the model description vector and a plurality of model vectors corresponding to a plurality of historical model descriptions for a plurality of historical machine learning models; and generating the historical model-based similarity vector based on the one or more relevant models and the plurality of model similarity scores.

7. The computer-implemented method of claim 1, wherein the training data comprises one or more training inputs and one or more training outputs, and wherein generating the label-based similarity vector comprises:

identifying the plurality of feature values based on the one or more training inputs;

generating a plurality of feature association metrics for the plurality of machine learning features based on a comparison between the plurality of feature values and the one or more training outputs; and generating the label-based similarity vector based on the plurality of feature association metrics, wherein the label-based similarity vector comprises one or more of the plurality of feature association metrics that satisfy a relative similarity threshold.

8. The computer-implemented method of claim 1, wherein the plurality of description-based similarity vectors comprises a domain-based similarity vector, a problem-based similarity vector, and a historical model-based similarity vector, and wherein the computer-implemented method further comprises:

generating a plurality of aggregated feature relevance scores for a subset of machine learning features from the plurality of machine learning features based on an aggregation of the domain-based similarity vector, the problem-based similarity vector, the historical model-based similarity vector, and the label-based similarity vector; and generating the predictive feature set based on the plurality of aggregated feature relevance scores.

9. The computer-implemented method of claim 8, wherein the domain-based similarity vector, the problem-based similarity vector, the historical model-based similarity vector, and the label-based similarity vector are associated with one or more different machine learning features from the plurality of machine learning features.

10. The computer-implemented method of claim 9, wherein the subset of machine learning features from the plurality of machine learning features comprises one or more machine learning features from each of the domain-based similarity vector, the problem-based similarity vector, the historical model-based similarity vector, and the label-based similarity vector.

11. The computer-implemented method of claim 9 further comprising:

generating a plurality of scaled feature relevance scores by applying one or more scaling parameters to the plurality of aggregated feature relevance scores, wherein the one or more scaling parameters include one or more user defined parameters indicative of a user preference for each of the domain-based similarity vector, the problem-based similarity vector, the historical model-based similarity vector, and the label-based similarity vector; and generating the predictive feature set based on the plurality of scaled feature relevance scores.

12. A system comprising:

one or more processors; and at least one memory storing processor-executable instructions that, when executed by the one or more processors, cause the one or more processors to:

generate a model description vector from a textual model description for a target machine learning model;

generate a plurality of description-based similarity vectors based on the model description vector, wherein:

(i) a description-based similarity vector of the plurality of description-based similarity vectors comprises one or more of a plurality of similarity scores for a plurality of machine learning features, and (ii) the plurality of similarity scores is based on the model description vector;

generate a label-based similarity vector based on a comparison between training data for the target machine learning model and a plurality of feature values of the plurality of machine learning features;

generate, based on the plurality of description-based similarity vectors and the label-based similarity vector, a predictive feature set comprising a pre-defined number of features that provide improved model performance when training the target machine learning model; and train the target machine learning model using the predictive feature set.

13. The system of claim 12, wherein the description-based similarity vector comprises a problem-based similarity vector and the plurality of similarity scores is based on a comparison between the model description vector and a plurality of feature description vectors corresponding to a plurality of textual feature descriptions for the plurality of machine learning features.

14. The system of claim 13, wherein the one or more processors are further configured to:

generate, using a language processing model, the plurality of feature description vectors based on the plurality of textual feature descriptions for the plurality of machine learning features;

generate, using a vector similarity model, a plurality of problem-based similarity scores based on a comparison between the model description vector and the plurality of feature description vectors; and generate the problem-based similarity vector based on the plurality of problem-based similarity scores, wherein the problem-based similarity vector comprises one or more similarity scores of the plurality of problem-based similarity scores that satisfy a relative similarity threshold.

15. The system of claim 12, wherein the description-based similarity vector comprises a domain-based similarity vector, and generating the plurality of description-based similarity vectors comprises:

identifying one or more relevant natural language documents based on a plurality of document similarity scores, wherein the plurality of document similarity scores is based on a comparison between the model description vector and a plurality of document vectors corresponding to a plurality of natural language documents for a model domain;

generating, using a vector similarity model, a plurality of domain-based similarity scores based on a comparison between (i) one or more document vectors of the plurality of document vectors that correspond to the one or more relevant natural language documents and (ii) a plurality of feature description vectors corresponding to a plurality of textual feature descriptions for the plurality of machine learning features; and generating the domain-based similarity vector based on the plurality of domain-based similarity scores, wherein the domain-based similarity vector comprises one or more domain-based similarity scores of the plurality of domain-based similarity scores that satisfy a relative similarity threshold.

16. The system of claim 12, wherein the description-based similarity vector comprises a historical model-based similarity vector, and the plurality of description-based similarity vectors comprises:

identifying one or more relevant models based on a plurality of model similarity scores, wherein the plurality of model similarity scores is based on a comparison between the model description vector and a plurality of model vectors corresponding to a plurality of historical model descriptions for a plurality of historical machine learning models; and generating the historical model-based similarity vector based on the one or more relevant models and the plurality of model similarity scores.

17. One or more non-transitory computer-readable storage media including instructions that, when executed by one or more processors, cause the one or more processors to:

generate a model description vector from a textual model description for a target machine learning model;

generate a plurality of description-based similarity vectors based on the model description vector, wherein:

(i) a description-based similarity vector of the plurality of description-based similarity vectors comprises one or more of a plurality of similarity scores for a plurality of machine learning features, and (ii) the plurality of similarity scores is based on the model description vector;

generate a label-based similarity vector based on a comparison between training data for the target machine learning model and a plurality of feature values of the plurality of machine learning features;

generate, based on the plurality of description-based similarity vectors and the label-based similarity vector, a predictive feature set comprising a pre-defined number of features that provide improved model performance when training the target machine learning model; and train the target machine learning model using the predictive feature set.

18. The one or more non-transitory computer-readable storage media of claim 17, wherein the training data comprise one or more training inputs and one or more training outputs, and wherein generating the label-based similarity vector comprises:

identifying the plurality of feature values based on the one or more training inputs;

generating a plurality of feature association metrics for the plurality of machine learning features based on a comparison between the plurality of feature values and the one or more training outputs; and generating the label-based similarity vector based on the plurality of feature association metrics, wherein the label-based similarity vector comprises one or more of the plurality of feature association metrics that satisfy a relative similarity threshold.

19. The one or more non-transitory computer-readable storage media of claim 17, wherein the plurality of description-based similarity vectors comprise a domain-based similarity vector, a problem-based similarity vector, and a historical model-based similarity vector, and wherein the instructions further cause the one or more processors to:

generate a plurality of aggregated feature relevance scores for a subset of machine learning features from the plurality of machine learning features based on an aggregation of the domain-based similarity vector, the problem-based similarity vector, the historical model-based similarity vector, and the label-based similarity vector; and generate the predictive feature set based on the plurality of aggregated feature relevance scores.

20. The one or more non-transitory computer-readable storage media of claim 19, wherein the domain-based similarity vector, the problem-based similarity vector, the historical model-based similarity vector, and the label-based similarity vector are associated with one or more different machine learning features from the plurality of machine learning features.

* * * * *